(12) United States Patent
Hein et al.

(10) Patent No.: US 9,376,063 B2
(45) Date of Patent: Jun. 28, 2016

(54) VEHICLE CARRIER SYSTEM

(71) Applicant: Yakima Products, Inc., Lake Oswego, OR (US)

(72) Inventors: Benjamin Hein, Portland, OR (US); Richard Jeli, Milwaukie, OR (US); Chris Sautter, Portland, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 92 days.

(21) Appl. No.: 13/874,391

(22) Filed: Apr. 30, 2013

(65) Prior Publication Data

US 2014/0246467 A1   Sep. 4, 2014

Related U.S. Application Data

(60) Provisional application No. 61/640,621, filed on Apr. 30, 2012, provisional application No. 61/677,419, filed on Jul. 30, 2012.

(51) Int. Cl.
| | |
|---|---|
| *B60R 9/00* | (2006.01) |
| *B60R 11/00* | (2006.01) |
| *B60R 9/10* | (2006.01) |
| *B60R 9/06* | (2006.01) |

(52) U.S. Cl.
CPC .... *B60R 9/10* (2013.01); *B60R 9/06* (2013.01)

(58) Field of Classification Search
CPC .............. B60R 9/10; B60R 9/06; B60R 9/048
USPC ....................................................... 224/519
See application file for complete search history.

(56) References Cited

U.S. PATENT DOCUMENTS

| | | |
|---|---|---|
| 303,686 A | 8/1884 | Whitney |
| 355,107 A | 12/1886 | Scollay |
| 357,287 A | 2/1887 | Nolte |

(Continued)

FOREIGN PATENT DOCUMENTS

| | | |
|---|---|---|
| CH | 272137 A | 11/1950 |
| DE | 3034750 A1 | 4/1982 |

(Continued)

OTHER PUBLICATIONS

535xt Classic Fork Mount Instructions, Thule U.S.A., undated, 5 pages.

(Continued)

*Primary Examiner* — Brian D Nash
*Assistant Examiner* — Derek Battisti
(74) *Attorney, Agent, or Firm* — Kolisch Hartwell, P.C.

(57) ABSTRACT

A carrier that mounts to a vehicle. In some embodiments, the carrier may include a pair of arms to support a bicycle. Each arm may include one or more securing devices each including a strap to contact a frame region of a bicycle and a pair of buckles to fasten the strap over the frame region. In some embodiments, the carrier may include a mount for a vehicle hitch. The mount may include a pair of user-actuated coupling members, such as a wedge member and a retractable retainer, each configured to attach the mount to the hitch. One of the coupling members (e.g., the retainer) may serve as a backup for the other coupling member to improve safety. In some embodiments, the carrier may include a mast that is releasable for backward pivotal motion away from the vehicle.

17 Claims, 13 Drawing Sheets

(56) References Cited

U.S. PATENT DOCUMENTS

| | | |
|---|---|---|
| 376,055 A | 1/1888 | Hopkins et al. |
| 569,289 A | 10/1896 | Lynch |
| 577,910 A | 3/1897 | Bierbach |
| 580,032 A | 4/1897 | Bierbach |
| 688,677 A | 12/1901 | Paddock |
| 1,055,665 A | 3/1913 | Schmidt |
| 1,666,568 A | 4/1928 | Jackson |
| 2,271,452 A | 1/1942 | Carroll |
| 2,492,841 A | 12/1949 | Burkey |
| 2,512,267 A | 6/1950 | Donnelley |
| 2,576,222 A | 11/1951 | Hill |
| 2,767,676 A | 10/1956 | Johnson et al. |
| 2,803,349 A | 8/1957 | Talbot |
| 2,844,856 A | 7/1958 | Mueller et al. |
| 2,889,165 A | 6/1959 | Zientara |
| 3,161,973 A | 12/1964 | Hastings |
| 3,184,880 A | 5/1965 | Ratte |
| 3,194,467 A | 7/1965 | Goonan et al. |
| 3,198,562 A | 8/1965 | Smith |
| 3,222,095 A | 12/1965 | Gerus |
| 3,239,115 A | 3/1966 | Bott et al. |
| 3,258,820 A | 7/1966 | Steinberg |
| 3,263,058 A | 7/1966 | Goonan |
| 3,292,222 A | 12/1966 | Steinberg |
| 3,464,608 A | 9/1969 | Rodriguez |
| 3,484,908 A | 12/1969 | Lamb |
| 3,662,435 A | 5/1972 | Allsop |
| 3,668,791 A | 6/1972 | Salzman et al. |
| 3,710,999 A | 1/1973 | Allen |
| 3,765,581 A | 10/1973 | Kosecoff |
| 3,828,993 A | 8/1974 | Carter |
| 3,844,517 A | 10/1974 | Fraser |
| 3,848,784 A | 11/1974 | Shimano et al. |
| 3,855,946 A | 12/1974 | Bales |
| 3,872,972 A | 3/1975 | Cummins et al. |
| 3,893,568 A | 7/1975 | Lile |
| 3,900,923 A | 8/1975 | Thomas |
| 3,906,593 A | 9/1975 | Caveney et al. |
| 3,912,139 A | 10/1975 | Bowman |
| 3,922,018 A | 11/1975 | Shook |
| 3,927,811 A | 12/1975 | Nussbaum |
| 4,021,888 A | 5/1977 | Aimar |
| 4,028,915 A | 6/1977 | Stahl |
| 4,057,182 A | 11/1977 | Kolkhorst et al. |
| 4,057,183 A | 11/1977 | Ness |
| 4,080,080 A | 3/1978 | Cisler |
| 4,085,874 A | 4/1978 | Graber |
| 4,109,839 A | 8/1978 | Allen |
| 4,112,557 A | 9/1978 | Salomon |
| 4,114,409 A | 9/1978 | Scire |
| 4,116,341 A | 9/1978 | Hebda |
| RE29,840 E | 11/1978 | Wasserman |
| 4,182,467 A | 1/1980 | Graber |
| 4,190,377 A | 2/1980 | Pleuss |
| 4,193,171 A | 3/1980 | Lichowsky |
| 4,274,569 A | 6/1981 | Winter et al. |
| 4,285,485 A | 8/1981 | Burke |
| 4,299,341 A | 11/1981 | Copeland et al. |
| 4,310,951 A | 1/1982 | Riedel |
| 4,326,320 A | 4/1982 | Riedel |
| 4,332,337 A | 6/1982 | Kosecoff |
| 4,345,705 A | 8/1982 | Graber |
| 4,386,709 A | 6/1983 | Graber |
| 4,389,135 A | 6/1983 | Peters |
| 4,394,948 A | 7/1983 | Graber |
| 4,400,038 A | 8/1983 | Hosokawa |
| 4,400,129 A | 8/1983 | Eisenberg et al. |
| 4,424,636 A | 1/1984 | Everest |
| 4,433,786 A | 2/1984 | Wahl |
| 4,442,961 A | 4/1984 | Bott |
| 4,453,290 A | 6/1984 | Riedel |
| 4,456,421 A | 6/1984 | Robson |
| 4,469,257 A | 9/1984 | Parker |
| 4,473,176 A | 9/1984 | Harper |
| 4,501,354 A | 2/1985 | Hoffman |
| 4,547,980 A | 10/1985 | Olivieri |
| 4,553,292 A | 11/1985 | Pradier et al. |
| 4,555,830 A | 12/1985 | Petrini et al. |
| 4,596,080 A | 6/1986 | Benoit et al. |
| 4,614,047 A | 9/1986 | Arieh et al. |
| 4,619,122 A | 10/1986 | Simpson |
| 4,621,873 A | 11/1986 | Weinstein et al. |
| 4,624,063 A | 11/1986 | Delery |
| 4,629,104 A | 12/1986 | Jacquet |
| 4,646,401 A | 3/1987 | Morell |
| 4,670,946 A | 6/1987 | Olivieri |
| 4,675,954 A | 6/1987 | Gullickson |
| 4,683,620 A | 8/1987 | Valsecchi et al. |
| 4,700,845 A | 10/1987 | Fretter |
| 4,702,401 A | 10/1987 | Graber et al. |
| 4,724,692 A | 2/1988 | Turin et al. |
| 4,726,499 A | 2/1988 | Hoerner |
| 4,727,630 A | 3/1988 | Alan |
| 4,759,137 A | 7/1988 | Lederer |
| 4,761,859 A | 8/1988 | Calabrigo |
| 4,761,898 A | 8/1988 | Courvoisier et al. |
| 4,763,957 A | 8/1988 | Poehlmann et al. |
| 4,770,011 A | 9/1988 | Constant |
| 4,789,206 A | 12/1988 | Ozaki |
| 4,796,337 A | 1/1989 | Marxer |
| 4,804,120 A | 2/1989 | Kraklio |
| 4,830,250 A | 5/1989 | Newbold et al. |
| 4,842,148 A | 6/1989 | Bowman |
| 4,856,686 A | 8/1989 | Workentine |
| 4,875,608 A | 10/1989 | Graber |
| 4,887,754 A | 12/1989 | Boyer et al. |
| 4,912,817 A | 4/1990 | Sandreid |
| 4,934,572 A | 6/1990 | Bowman et al. |
| 4,938,475 A | 7/1990 | Sargeant et al. |
| 4,939,824 A | 7/1990 | Reed |
| 4,951,487 A | 8/1990 | Dennis |
| 4,964,287 A | 10/1990 | Gaul |
| 5,003,672 A | 4/1991 | Randall |
| 5,003,711 A | 4/1991 | Nerrinck et al. |
| 5,005,390 A | 4/1991 | Giannini et al. |
| 5,007,260 A | 4/1991 | Sharp |
| 5,007,568 A | 4/1991 | Da Vault |
| 5,014,890 A | 5/1991 | Perry |
| 5,020,708 A | 6/1991 | Kalbach |
| 5,022,672 A | 6/1991 | Kawai |
| 5,027,628 A | 7/1991 | De Rocher et al. |
| 5,037,019 A | 8/1991 | Sokn |
| 5,042,705 A | 8/1991 | Johansson |
| 5,052,605 A | 10/1991 | Johansson |
| 5,056,699 A | 10/1991 | Newbold et al. |
| 5,056,700 A | 10/1991 | Blackburn et al. |
| 5,065,921 A | 11/1991 | Mobley |
| 5,083,350 A | 1/1992 | Sandreid |
| 5,092,504 A | 3/1992 | Hannes et al. |
| 5,094,373 A | 3/1992 | Lovci |
| 5,098,162 A | 3/1992 | Forget et al. |
| 5,108,018 A | 4/1992 | Spinka |
| 5,118,020 A | 6/1992 | Piretti |
| 5,118,125 A | 6/1992 | Plunkett |
| 5,127,564 A | 7/1992 | Romero |
| 5,135,145 A | 8/1992 | Hannes et al. |
| 5,135,330 A | 8/1992 | Chen |
| 5,165,762 A | 11/1992 | Phillips |
| 5,169,042 A | 12/1992 | Ching |
| 5,169,044 A | 12/1992 | Englander |
| 5,172,454 A | 12/1992 | Martignago |
| 5,181,822 A | 1/1993 | Allsop et al. |
| 5,190,195 A | 3/1993 | Fullhart et al. |
| 5,193,254 A | 3/1993 | Geisinger |
| 5,195,670 A | 3/1993 | Piretti et al. |
| 5,201,911 A | 4/1993 | Lee |
| 5,211,323 A | 5/1993 | Chimenti et al. |
| 5,215,232 A | 6/1993 | Wyers |
| 5,226,341 A | 7/1993 | Shores |
| 5,232,133 A | 8/1993 | Speer |
| 5,232,134 A | 8/1993 | Allen |
| 5,244,133 A | 9/1993 | Abbott et al. |
| 5,259,542 A * | 11/1993 | Newbold et al. ............... 224/324 |
| 5,265,897 A | 11/1993 | Stephens |

(56) References Cited

U.S. PATENT DOCUMENTS

| | | |
|---|---|---|
| 5,275,319 A | 1/1994 | Ruana |
| 5,288,001 A | 2/1994 | Locarno |
| 5,291,763 A | 3/1994 | Cuisinot |
| 5,299,773 A | 4/1994 | Bertrand |
| 5,303,857 A | 4/1994 | Hewson |
| 5,305,936 A | 4/1994 | Nusbaum |
| D346,995 S | 5/1994 | Thulin |
| 5,316,192 A | 5/1994 | Ng |
| 5,330,084 A | 7/1994 | Peters |
| 5,330,312 A | 7/1994 | Allsop et al. |
| 5,333,888 A | 8/1994 | Ball |
| 5,344,175 A | 9/1994 | Speer |
| 5,357,690 A | 10/1994 | Ho |
| 5,362,173 A | 11/1994 | Ng |
| 5,363,996 A | 11/1994 | Raaber et al. |
| 5,373,978 A | 12/1994 | Buttchen et al. |
| 5,377,885 A | 1/1995 | Wyers |
| 5,416,952 A | 5/1995 | Dodge |
| 5,423,566 A | 6/1995 | Warrington et al. |
| 5,426,826 A | 6/1995 | Takimoto |
| 5,427,286 A | 6/1995 | Hagerty |
| 5,435,475 A | 7/1995 | Hudson et al. |
| 5,443,189 A | 8/1995 | Hirschfeld |
| 5,448,805 A | 9/1995 | Allen et al. |
| 5,476,200 A | 12/1995 | Wong |
| 5,476,202 A | 12/1995 | Lipp |
| 5,479,836 A | 1/1996 | Chang |
| 5,492,258 A | 2/1996 | Brunner |
| 5,495,970 A | 3/1996 | Pedrini |
| 5,505,357 A | 4/1996 | Chimenti et al. |
| 5,511,894 A | 4/1996 | Ng |
| 5,516,020 A | 5/1996 | Lawler et al. |
| 5,526,555 A | 6/1996 | Battistella et al. |
| 5,526,971 A | 6/1996 | Despain |
| 5,527,146 A | 6/1996 | Allsop et al. |
| 5,529,231 A | 6/1996 | Burgess |
| 5,560,498 A | 10/1996 | Porter |
| 5,560,666 A | 10/1996 | Vieira et al. |
| 5,570,825 A | 11/1996 | Cona |
| 5,573,165 A | 11/1996 | Bloemer et al. |
| 5,579,972 A | 12/1996 | Despain |
| 5,582,044 A | 12/1996 | Bolich |
| 5,593,076 A | 1/1997 | Biondo |
| 5,598,959 A | 2/1997 | Lorensen et al. |
| 5,598,960 A | 2/1997 | Allen et al. |
| D378,289 S | 3/1997 | Lundgren |
| 5,607,064 A | 3/1997 | Fourel |
| 5,611,472 A | 3/1997 | Miller |
| 5,624,063 A | 4/1997 | Ireland |
| 5,645,202 A | 7/1997 | Kaloustian |
| 5,658,119 A | 8/1997 | Allsop et al. |
| 5,664,717 A | 9/1997 | Joder |
| 5,685,686 A | 11/1997 | Burns |
| 5,690,259 A | 11/1997 | Montani |
| 5,690,260 A | 11/1997 | Aikins et al. |
| 5,692,659 A | 12/1997 | Reeves |
| 5,699,684 A | 12/1997 | Sulin |
| 5,699,945 A | 12/1997 | Micklish |
| 5,709,521 A | 1/1998 | Glass et al. |
| 5,730,345 A | 3/1998 | Yeckley et al. |
| 5,738,258 A | 4/1998 | Farrow et al. |
| 5,745,959 A | 5/1998 | Dodge |
| 5,749,694 A | 5/1998 | Ackerman et al. |
| 5,752,298 A | 5/1998 | Howell |
| 5,775,555 A | 7/1998 | Bloemer et al. |
| 5,775,560 A | 7/1998 | Zahn et al. |
| 5,779,116 A | 7/1998 | Rösch et al. |
| 5,779,119 A | 7/1998 | Talbot et al. |
| 5,794,828 A | 8/1998 | Colan et al. |
| 5,820,002 A | 10/1998 | Allen |
| 5,826,767 A | 10/1998 | Chimenti et al. |
| D401,195 S | 11/1998 | Chimenti |
| 5,833,074 A | 11/1998 | Phillips |
| 5,875,947 A | 3/1999 | Noel et al. |
| 5,931,362 A | 8/1999 | Chimenti |
| 5,950,891 A | 9/1999 | Brungardt et al. |
| 5,988,402 A | 11/1999 | Mayfield |
| 5,992,720 A | 11/1999 | Miller |
| 5,996,870 A | 12/1999 | Shaver |
| 5,996,957 A | 12/1999 | Kurtz |
| 6,000,594 A | 12/1999 | Chimenti |
| 6,023,821 A | 2/2000 | Murray |
| 6,053,336 A | 4/2000 | Reeves |
| 6,167,735 B1 | 1/2001 | Brown |
| 6,202,458 B1 | 3/2001 | Buchalter |
| 6,206,259 B1 | 3/2001 | Brungardt et al. |
| 6,260,931 B1 | 7/2001 | Stewart |
| 6,283,310 B1 * | 9/2001 | Dean et al. ............. 211/20 |
| 6,283,349 B1 | 9/2001 | Morris et al. |
| 6,284,210 B1 | 9/2001 | Euzen et al. |
| 6,286,738 B1 * | 9/2001 | Robins et al. .............. 224/314 |
| 6,321,962 B1 | 11/2001 | Morris et al. |
| 6,334,561 B1 | 1/2002 | Cole |
| 6,386,407 B1 | 5/2002 | Erickson et al. |
| 6,401,999 B1 | 6/2002 | Hehr |
| 6,409,065 B1 | 6/2002 | Edgerly |
| 6,425,509 B1 | 7/2002 | Dean et al. |
| 6,431,423 B1 | 8/2002 | Allen et al. |
| 6,460,708 B2 | 10/2002 | Dean et al. |
| 6,467,664 B2 | 10/2002 | Robins et al. |
| 6,516,986 B1 | 2/2003 | Lassanske et al. |
| 6,526,789 B1 | 3/2003 | Edgerly et al. |
| 6,561,398 B1 | 5/2003 | Cole et al. |
| 6,598,897 B1 * | 7/2003 | Patti .................. B60D 1/06 |
| | | 280/478.1 |
| 6,601,712 B2 | 8/2003 | Dean et al. |
| 6,616,023 B1 | 9/2003 | Dahl et al. |
| 6,644,525 B1 | 11/2003 | Allen et al. |
| 6,745,926 B2 | 6/2004 | Chimenti |
| 6,758,380 B1 | 7/2004 | Kolda |
| 6,840,418 B2 | 1/2005 | Robins et al. |
| 6,918,520 B2 | 7/2005 | Skinner |
| 6,929,163 B1 | 8/2005 | Pedrini et al. |
| 6,938,782 B2 | 9/2005 | Dean et al. |
| 6,974,147 B1 * | 12/2005 | Kolda .................. 280/506 |
| 6,988,645 B1 | 1/2006 | Nusbaum et al. |
| 7,004,491 B1 | 2/2006 | Allsop et al. |
| 7,055,725 B1 | 6/2006 | Kolda |
| 7,213,731 B1 * | 5/2007 | Kolda .................. 224/537 |
| 7,404,504 B2 | 7/2008 | Settelmayer |
| D602,420 S | 10/2009 | Kuschmeader et al. |
| 7,757,917 B2 | 7/2010 | Bogoslofski et al. |
| 7,866,517 B2 | 1/2011 | Pedrini |
| 7,975,888 B2 | 7/2011 | Settelmayer |
| 8,025,196 B2 | 9/2011 | Flaherty et al. |
| 8,113,398 B2 | 2/2012 | Sautter et al. |
| 8,136,709 B2 | 3/2012 | Jeli et al. |
| 8,141,760 B2 | 3/2012 | Kuschmeader et al. |
| 8,210,408 B2 | 7/2012 | Sautter et al. |
| 8,220,681 B2 | 7/2012 | Farber |
| 8,235,268 B2 | 8/2012 | Sautter et al. |
| 8,490,847 B2 | 7/2013 | Sautter et al. |
| 8,602,279 B2 | 12/2013 | Sautter et al. |
| 2002/0003156 A1 | 1/2002 | Morris et al. |
| 2002/0026816 A1 | 3/2002 | Katsouros et al. |
| 2002/0038810 A1 | 4/2002 | Robins et al. |
| 2003/0089752 A1 | 5/2003 | Robins et al. |
| 2004/0029645 A1 | 2/2004 | Chen |
| 2005/0061842 A1 | 3/2005 | Tsai |
| 2005/0199669 A1 | 9/2005 | Robins et al. |
| 2006/0091173 A1 | 5/2006 | Morales et al. |
| 2006/0131354 A1 | 6/2006 | Huang |
| 2006/0138186 A1 * | 6/2006 | Pedrini .................. 224/497 |
| 2006/0237504 A1 | 10/2006 | Settelmayer et al. |
| 2006/0273125 A1 | 12/2006 | Bogoslofski et al. |
| 2006/0273504 A1 | 12/2006 | Yonezawa et al. |
| 2006/0292915 A1 | 12/2006 | Bogoslofski et al. |
| 2007/0057001 A1 | 3/2007 | Wang |
| 2007/0108245 A1 | 5/2007 | Ferman et al. |
| 2007/0196632 A1 | 8/2007 | Meyer, Jr. et al. |
| 2007/0235487 A1 | 10/2007 | Bogoslofski et al. |
| 2007/0246496 A1 | 10/2007 | Reeves et al. |
| 2008/0093404 A1 | 4/2008 | Clausen et al. |
| 2008/0099522 A1 | 5/2008 | Clausen et al. |

(56) References Cited

U.S. PATENT DOCUMENTS

| | | |
|---|---|---|
| 2008/0190979 A1 | 8/2008 | Robins et al. |
| 2009/0120985 A1 | 5/2009 | Sautter et al. |
| 2009/0120986 A1 | 5/2009 | Sautter et al. |
| 2011/0057008 A1 | 3/2011 | Clausen et al. |
| 2011/0089669 A1* | 4/2011 | Despres ............ B60D 1/52 280/478.1 |
| 2013/0015220 A1 | 1/2013 | Robins et al. |
| 2013/0020364 A1 | 1/2013 | Sautter et al. |
| 2013/0020365 A1 | 1/2013 | Sautter et al. |
| 2013/0020366 A1 | 1/2013 | Sautter et al. |
| 2013/0181022 A1* | 7/2013 | Bogoslofski et al. ......... 224/250 |

FOREIGN PATENT DOCUMENTS

| | | |
|---|---|---|
| DE | 4208064 A1 | 5/1993 |
| DE | 4225110 A1 | 2/1994 |
| EP | 0016738 A1 | 1/1980 |
| EP | 0079318 B1 | 5/1983 |
| EP | 0161441 A1 | 11/1985 |
| EP | 0220784 A1 | 5/1987 |
| EP | 0224288 A1 | 6/1987 |
| EP | 0755826 B1 | 6/2000 |
| FR | 1083830 A | 1/1955 |
| FR | 2221329 A1 | 10/1974 |
| FR | 2332155 A1 | 6/1977 |
| FR | 2451296 A1 | 10/1980 |
| FR | 2668435 A1 | 4/1992 |
| GB | 478828 A | 1/1938 |
| GB | 856748 A | 12/1960 |
| GB | 2220344 A | 1/1990 |
| IT | 1189908 B | 2/1988 |
| IT | 01236808 B | 11/1989 |
| IT | 1236808 B | 4/1993 |
| NL | 7704505 A | 12/1977 |
| WO | 9402338 A1 | 2/1994 |
| WO | 0138141 A1 | 5/2001 |
| WO | 2013164693 A2 | 11/2013 |

OTHER PUBLICATIONS

Thelakelandgear, Hollywood Road Runner Hitch Mounted Bike Rack, You Tube video dated Jan. 3, 2012, Retrieved on Mar. 5, 2014, Retrieved from Internet at URL: http://www. www.youtube.com/watch?v=93XtmUr_eio, 15 pages.

* cited by examiner

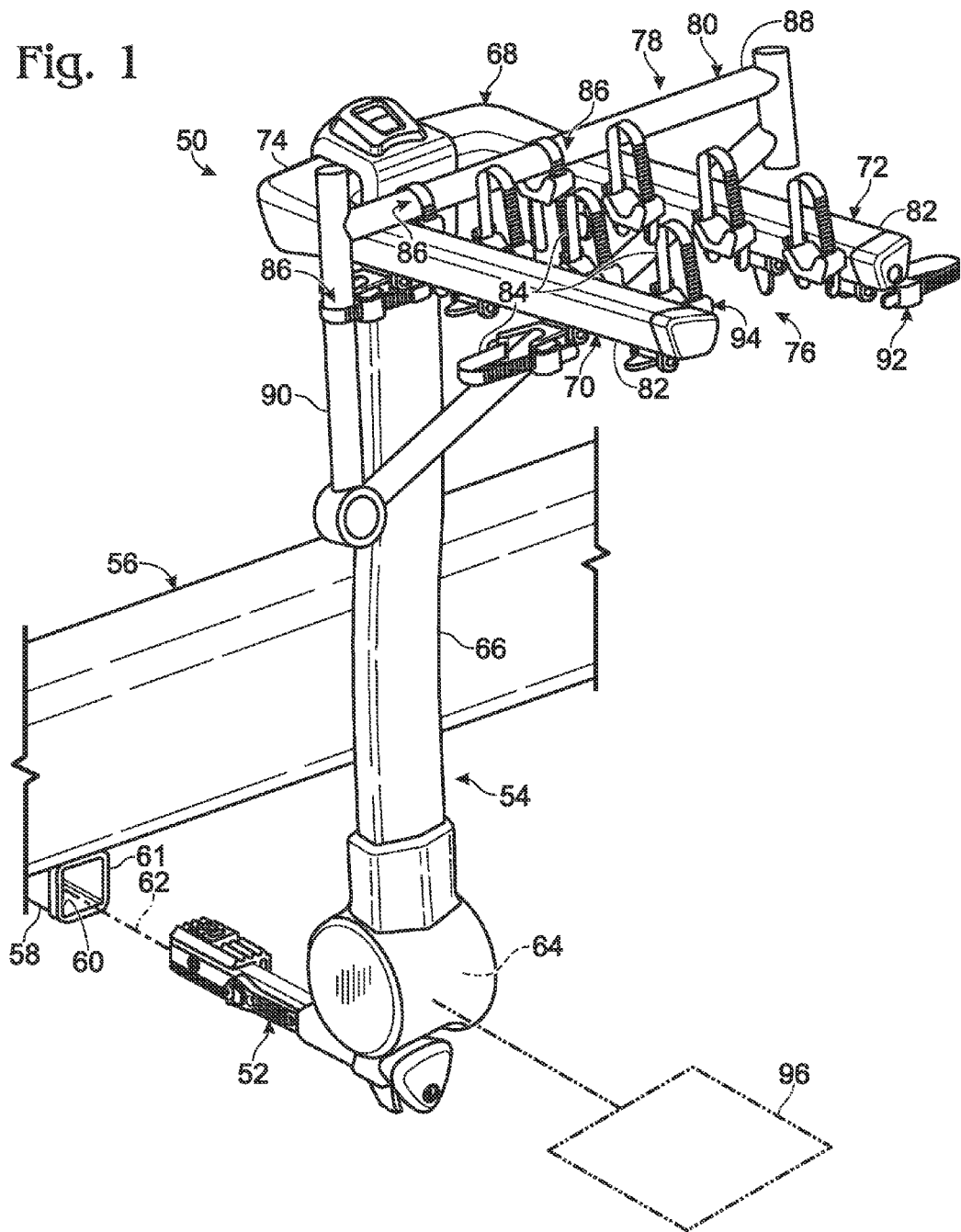

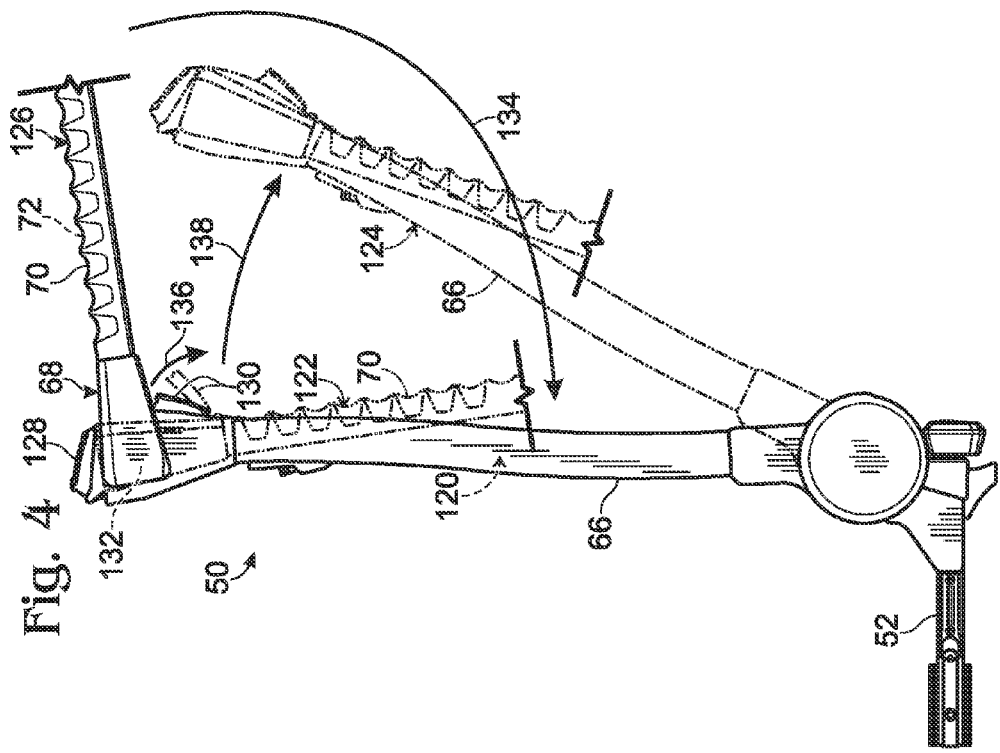
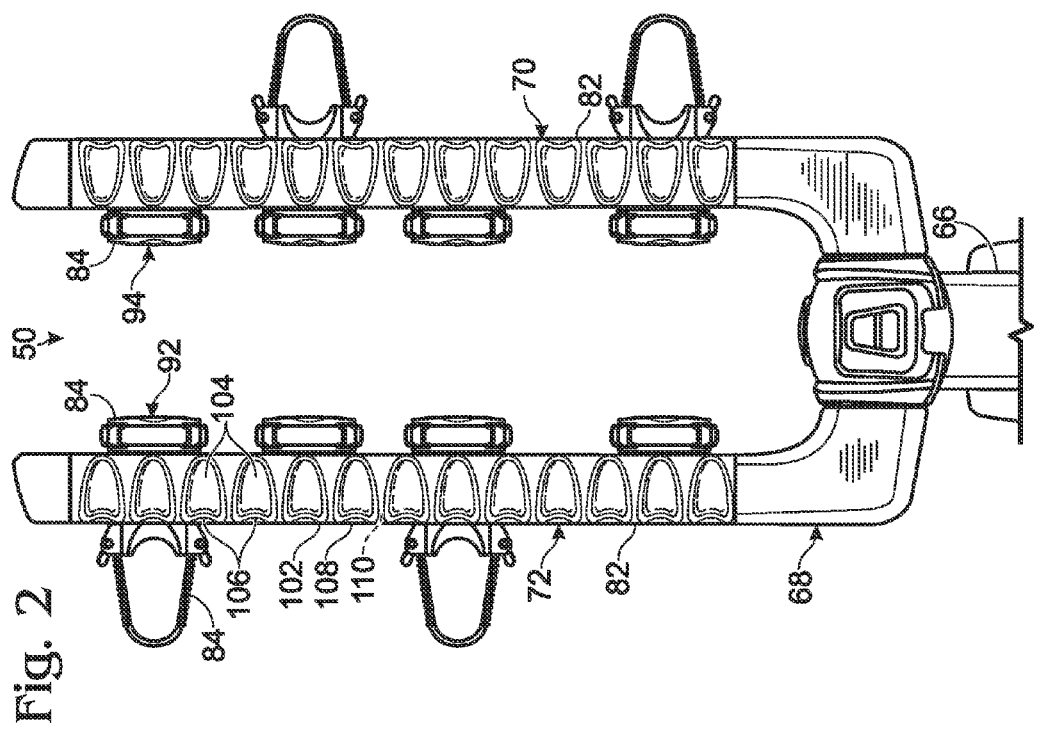

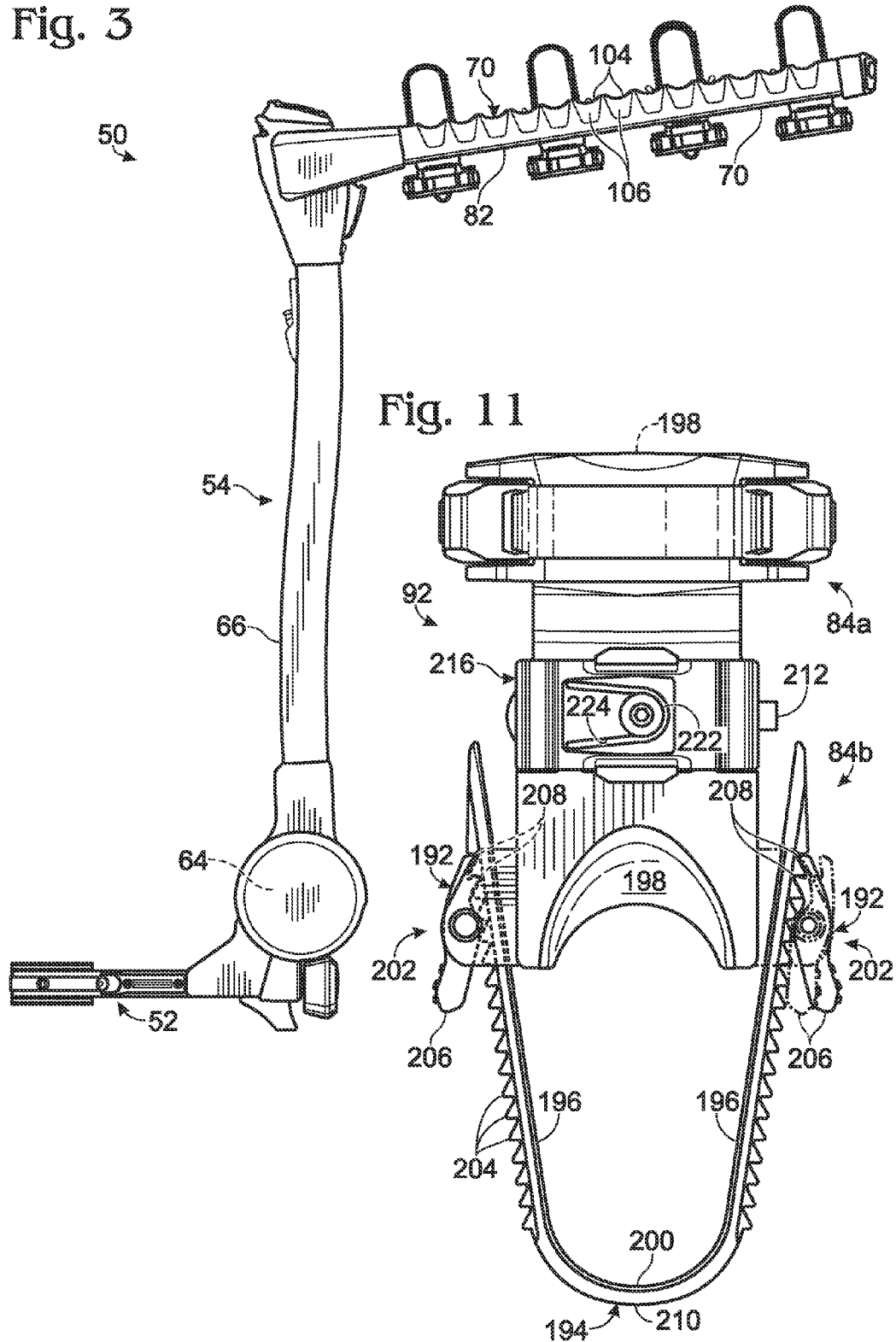

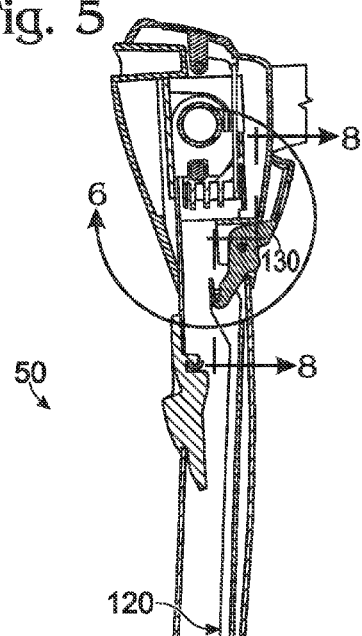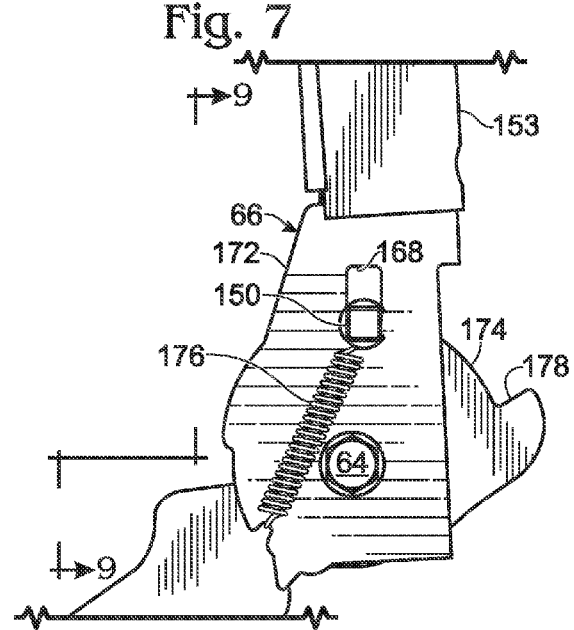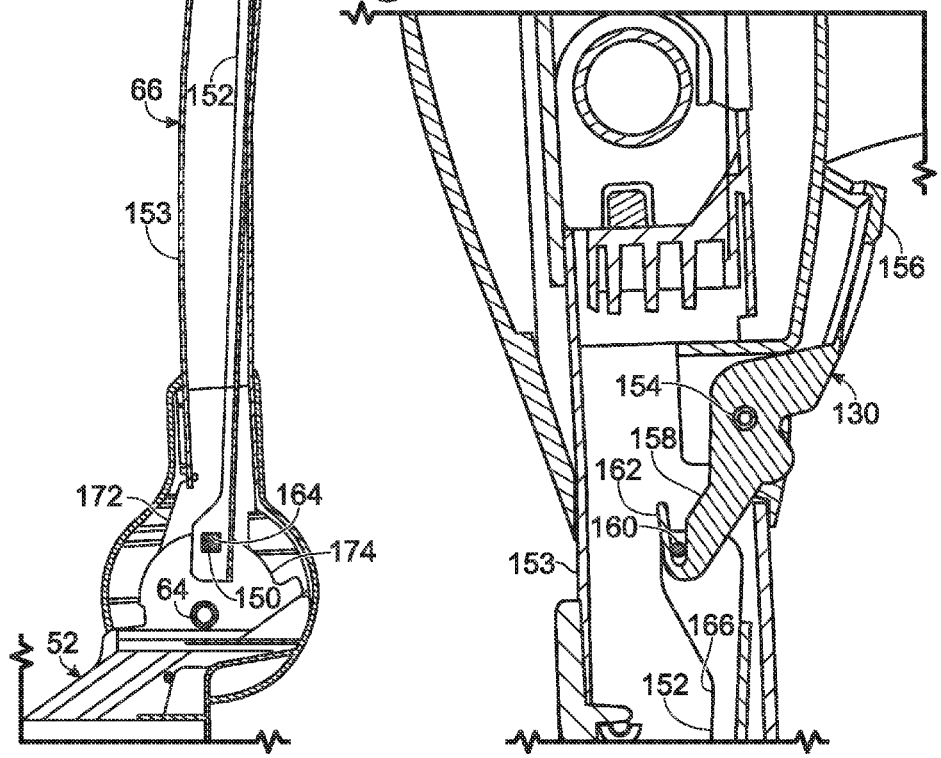

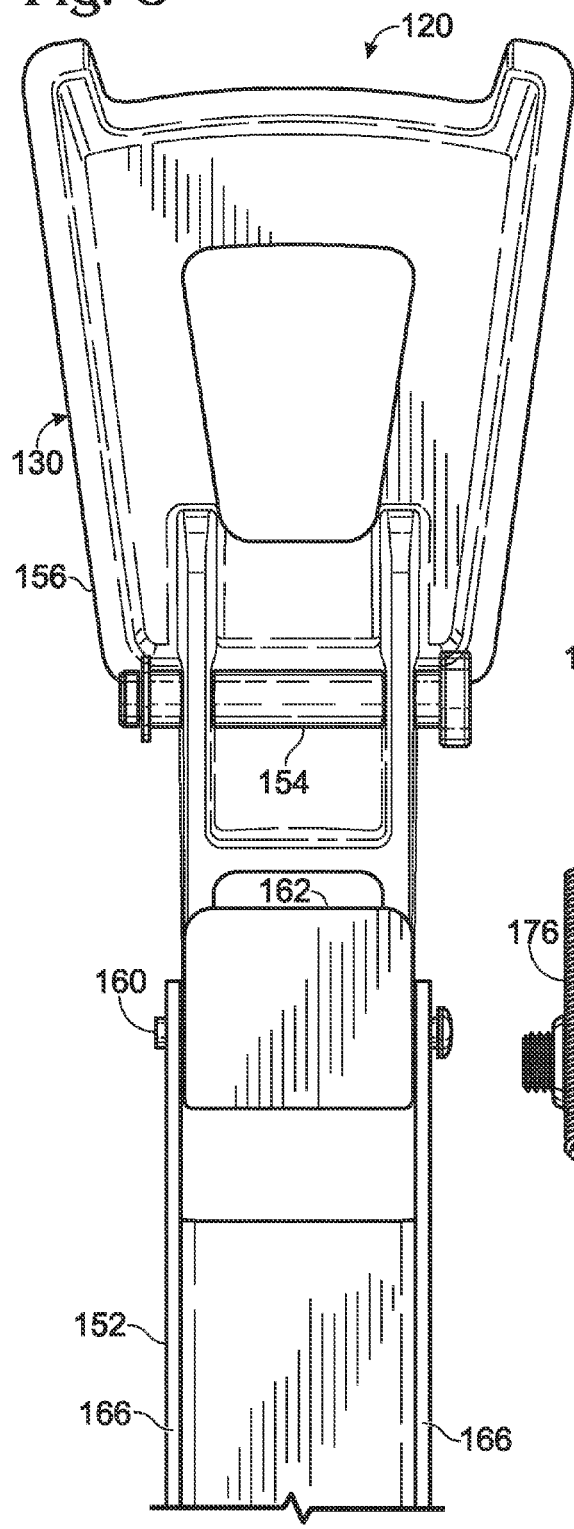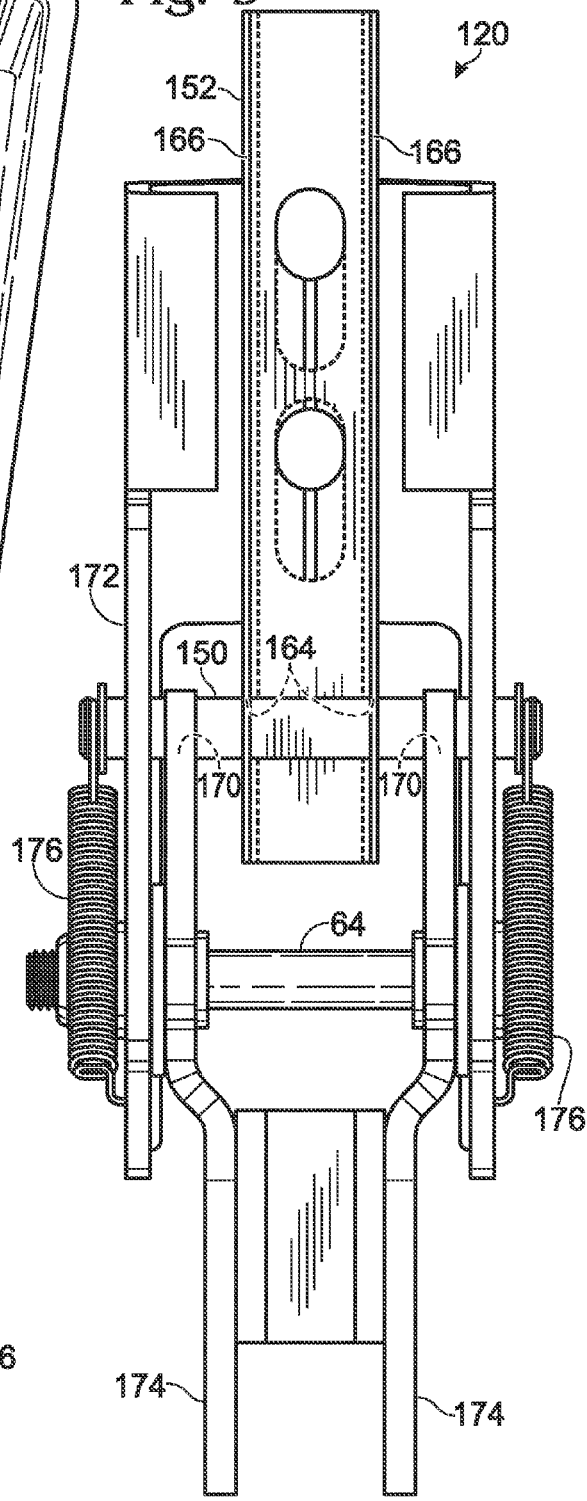

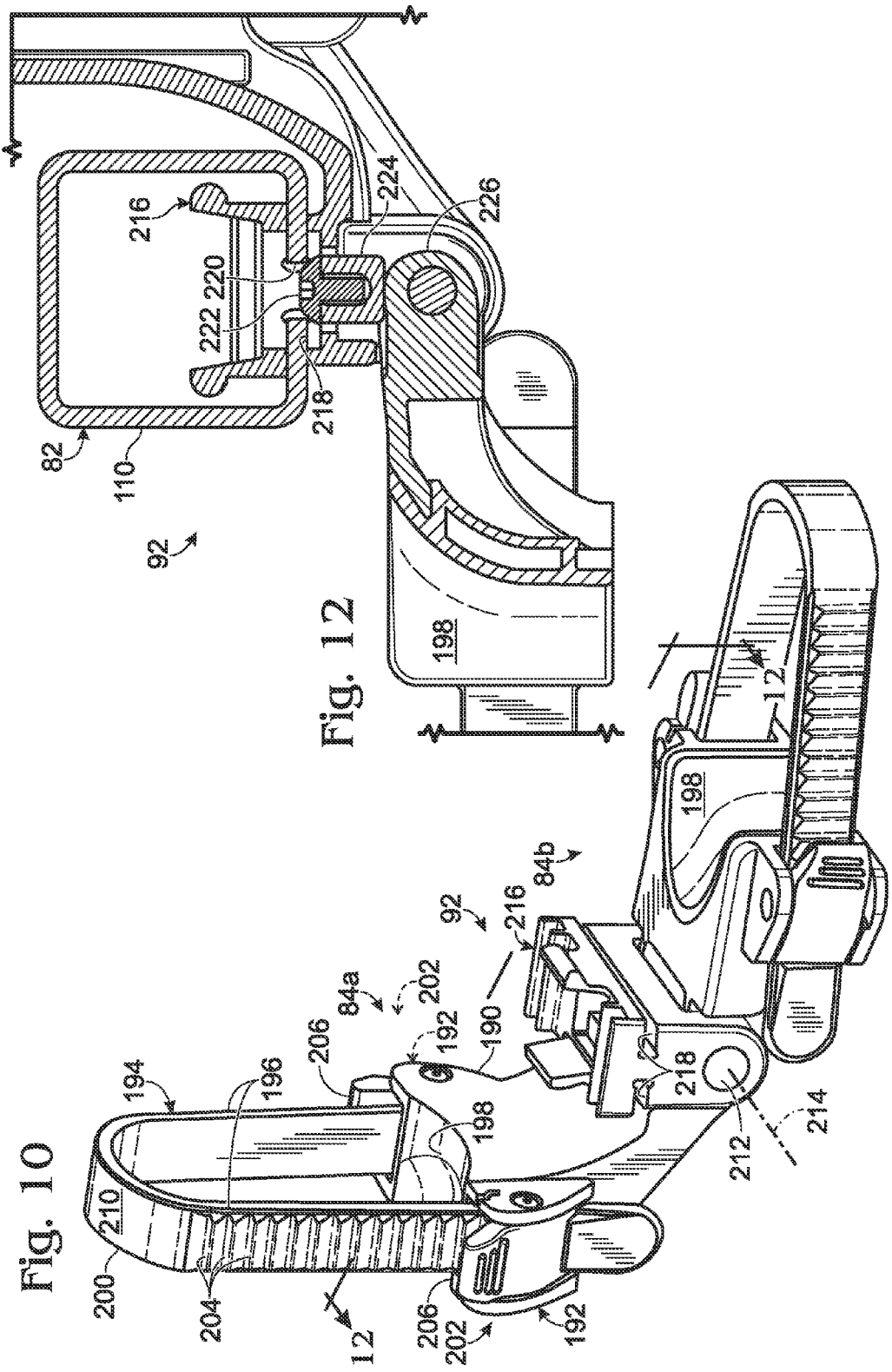

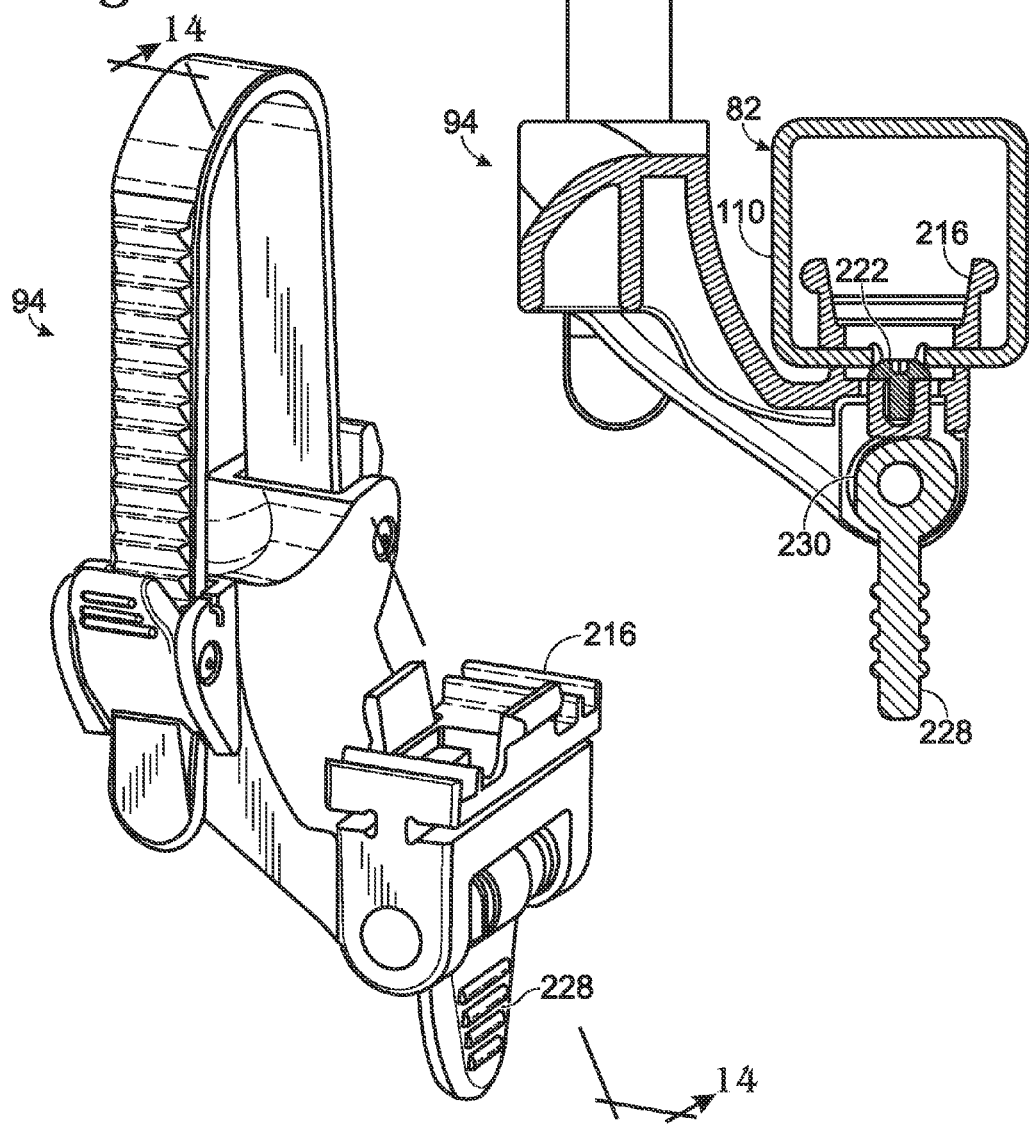

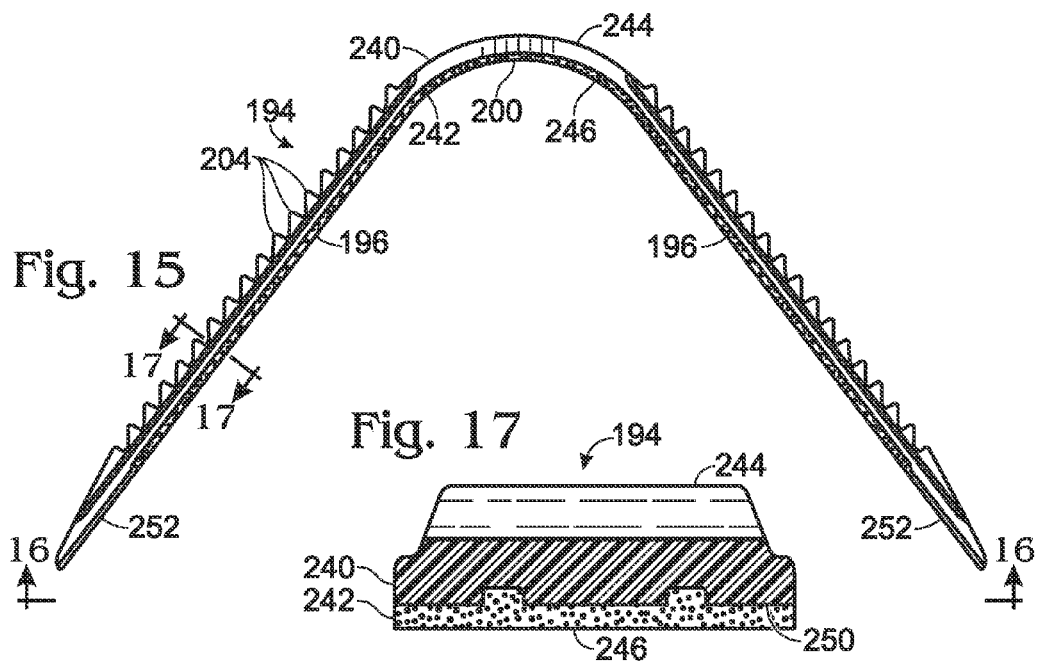
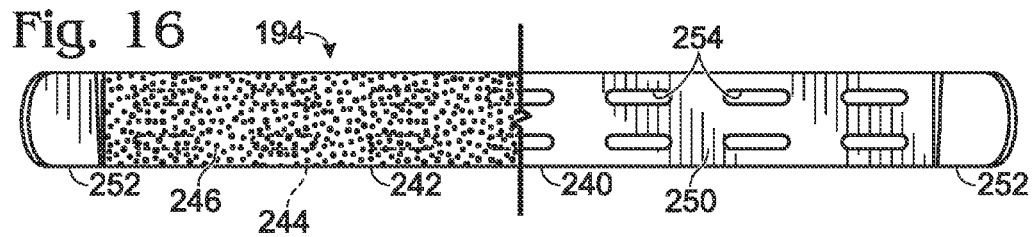
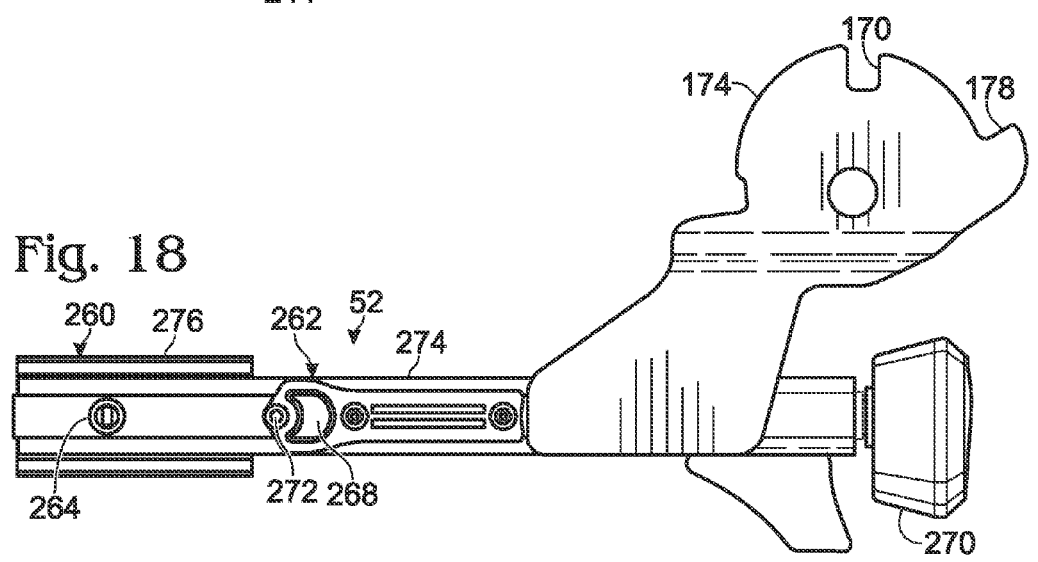

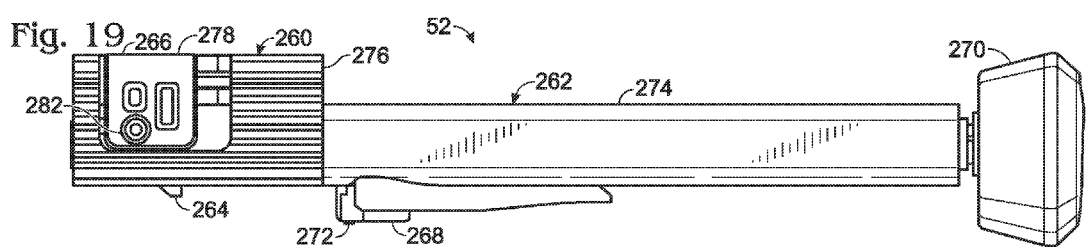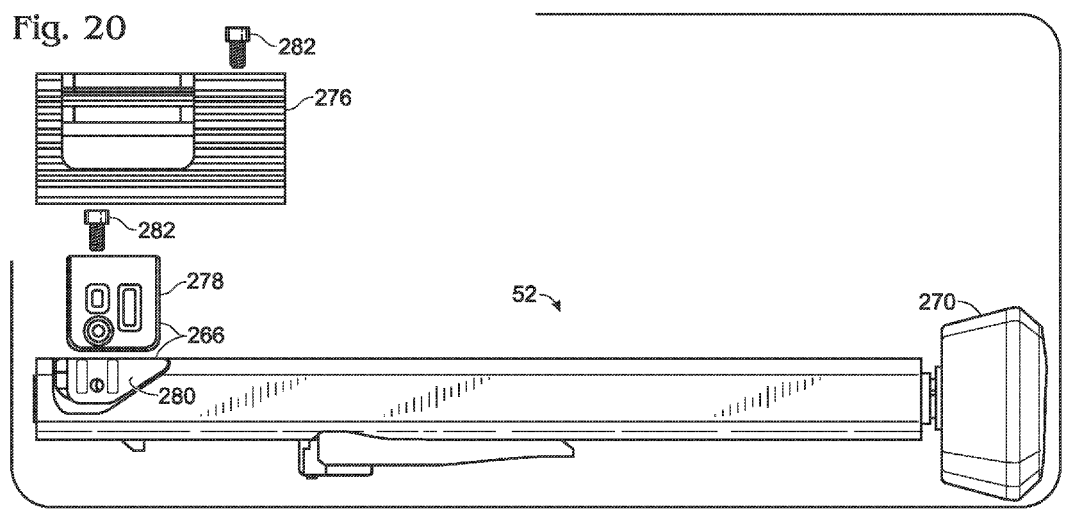

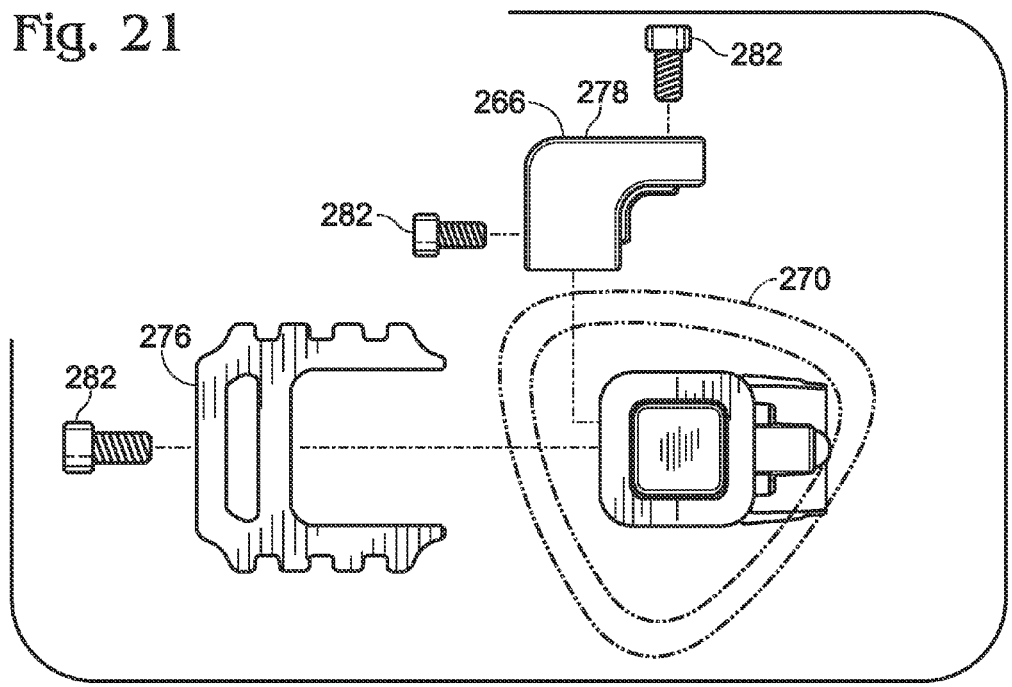
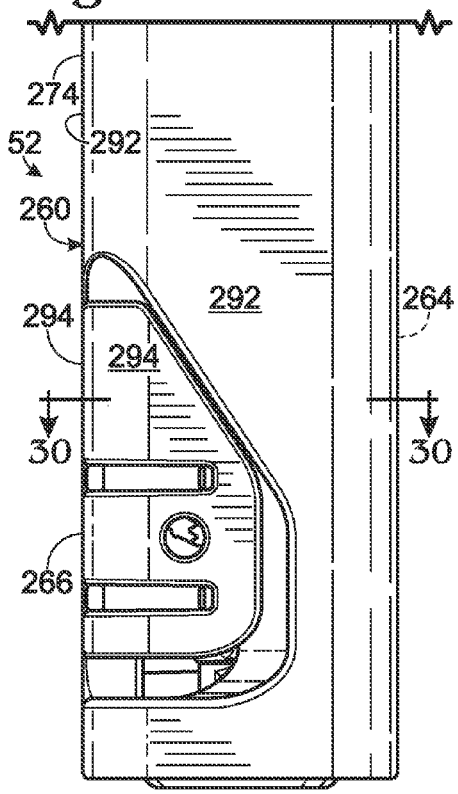
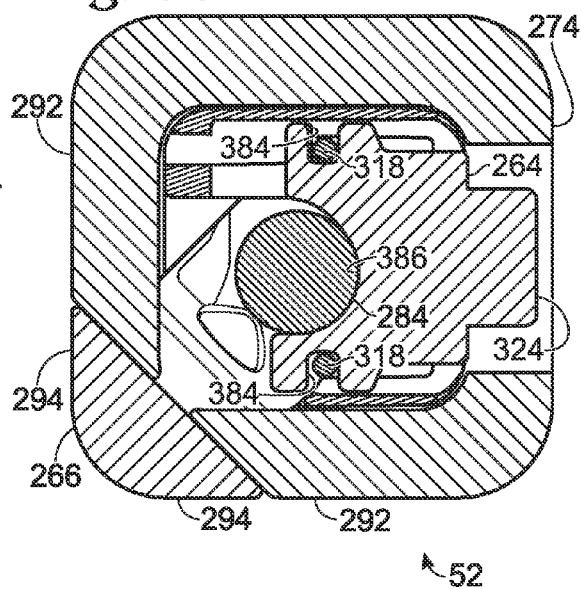

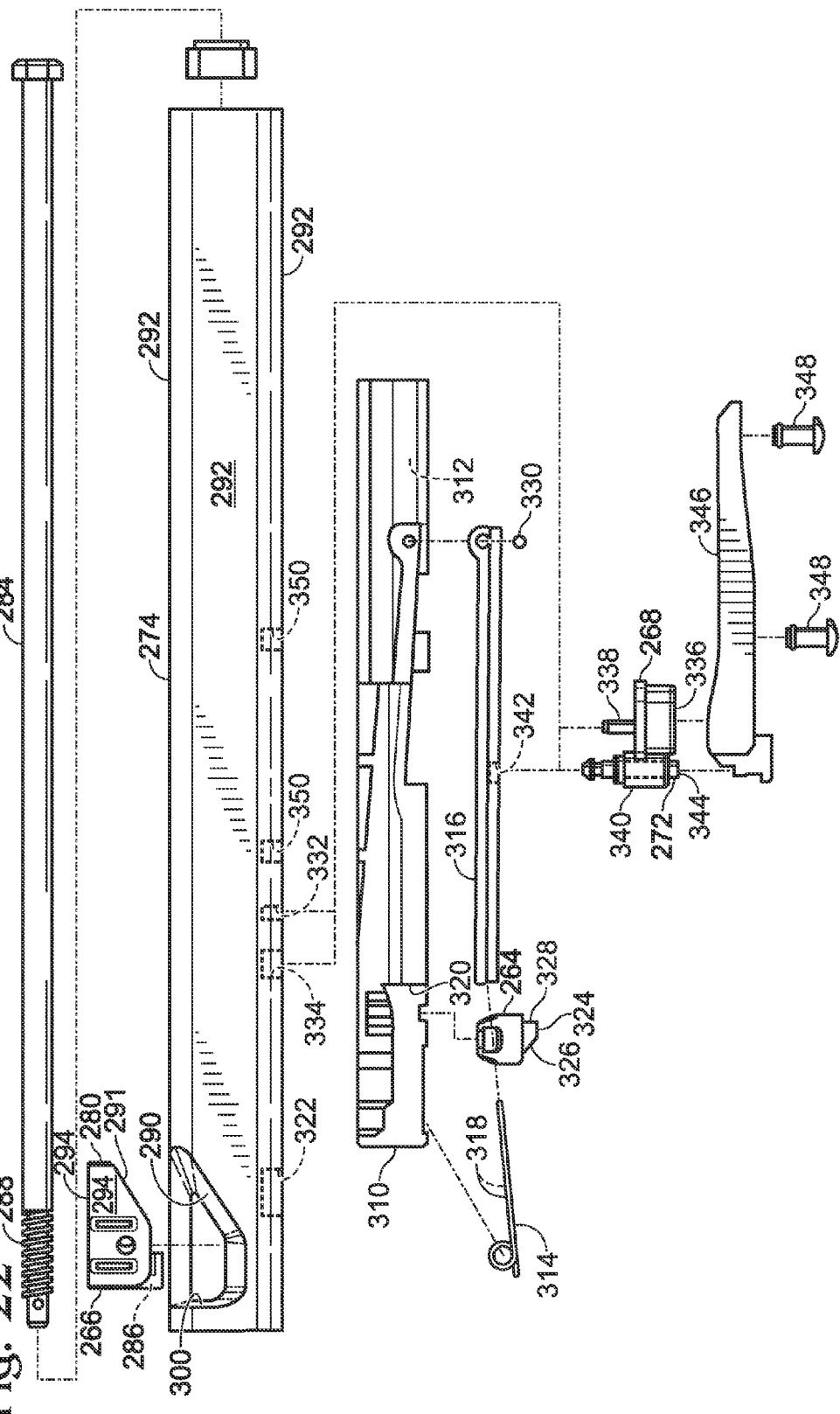

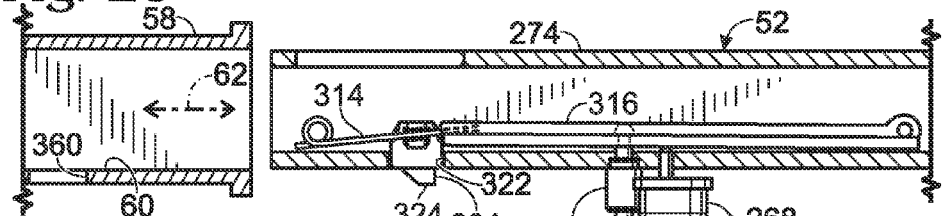
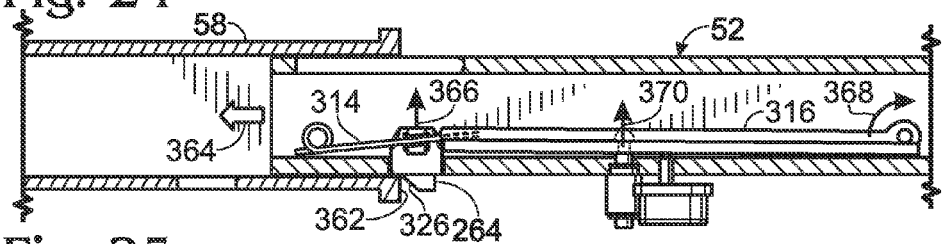
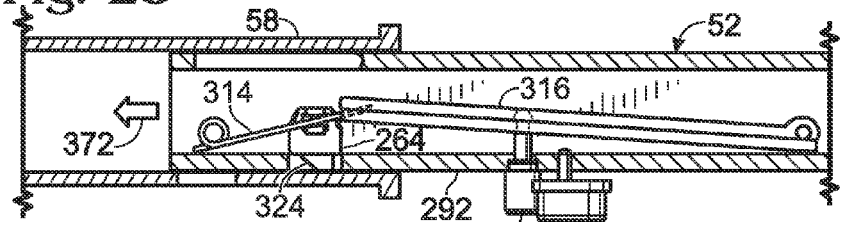
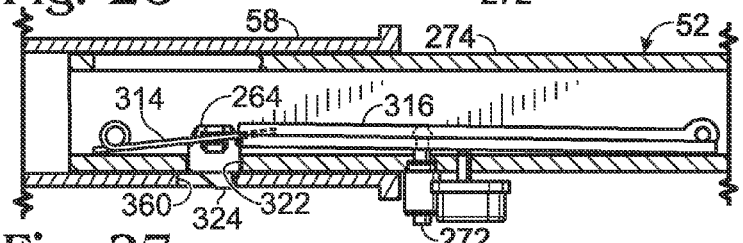
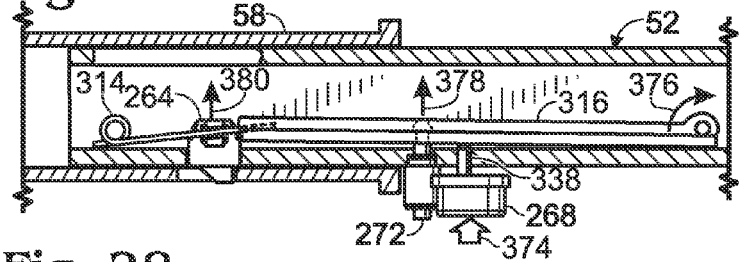
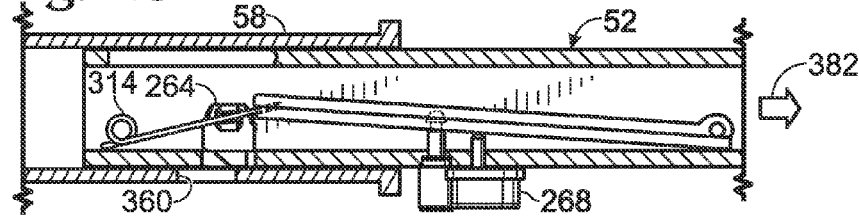

VEHICLE CARRIER SYSTEM

CROSS-REFERENCES TO PRIORITY APPLICATIONS

This application is based upon and claims the benefit under 35 U.S.C. §119(e) of U.S. Provisional Patent Application Ser. No. 61/640,621, filed Apr. 30, 2012; and U.S. Provisional Patent Application Ser. No. 61/677,419, filed Jul. 30, 2012. Each of these priority applications is incorporated herein by reference in its entirety for all purposes.

CROSS-REFERENCES TO OTHER MATERIALS

This application incorporates herein by reference each of the following patents in its entirety for all purposes: U.S. Pat. Nos. 5,244,133; 5,685,686; 6,386,407; 6,425,509; 6,840,418; 7,004,491; 7,404,504; 7,975,888; 8,210,408; and 8,235,268.

INTRODUCTION

The popularity of recreational and competitive cycling has grown substantially in recent years, with a corresponding expansion in the number of different bike designs and configurations. As a result, the demand for bicycle carriers to transport bikes of varying dimensions and designs on cars and other vehicles also has grown significantly. The carriers can be mounted at various positions on a vehicle, such as mounted to the trailer hitch of a vehicle to carry one or more bicycles adjacent the rear of the vehicle. Innovation is still needed to improve carriers that mount to a trailer hitch and/or hold bicycles.

SUMMARY

The present disclosure provides a carrier that mounts to a vehicle. In some embodiments, the carrier may include a pair of arms to support a bicycle. Each arm may include one or more securing devices each including a strap to contact a frame region of a bicycle and a pair of buckles to fasten the strap over the frame region. In some embodiments, the carrier may include a mount for a vehicle hitch. The mount may include a pair of user-actuated coupling members, such as a wedge member and a retractable retainer, each configured to attach the mount to the hitch. One of the coupling members (e.g., the retainer) may serve as a backup for the other coupling member to improve safety. In some embodiments, the carrier may include a mast that is releasable for backward pivotal motion away from the vehicle.

BRIEF DESCRIPTION OF THE DRAWINGS

FIG. 1 is an isometric view of an exemplary bicycle carrier having a mount aligned with a trailer hitch of a vehicle and supporting a bicycle frame that is fastened to arms of the carrier, in accordance with aspects of the present disclosure.

FIG. 2 is a fragmentary top view of the bicycle carrier of FIG. 1 taken in isolation from the bicycle frame.

FIG. 3 is a side view of the bicycle carrier of FIG. 1 taken in isolation from the bicycle frame.

FIG. 4 is a fragmentary side view of the bicycle carrier of FIG. 1, taken as in FIG. 3, with exemplary storage and tilted configurations shown in phantom lines.

FIG. 5 is a fragmentary sectional view of the bicycle carrier of FIG. 1, taken longitudinally through a mast and a mount of the carrier and showing a locking/release assembly that is adjustable to unlock a pivot joint (e.g., a hinge joint) that connects the mast to the mount, to allow the mast to be tilted backward away from the vehicle.

FIG. 6 is a fragmentary sectional view of the bicycle carrier of FIG. 1, taken as in FIG. 5 around the region indicated at "6" in FIG. 5 to show aspects of the upper end of the locking/release assembly.

FIG. 7 is a fragmentary side view of the bicycle carrier of FIG. 1, taken as in FIG. 3 around a pivot joint connecting the mast to the mount, with a cover removed to reveal aspects of the locking/release assembly disposed near the pivot joint.

FIG. 8 is a fragmentary front view of selected aspects of the bicycle carrier of FIG. 1, particularly an upper end of the locking/release assembly for the mast viewed generally along line 8-8 of FIG. 5.

FIG. 9 is a fragmentary front view of selected aspects of the bicycle carrier of FIG. 1, particularly a lower end of the mast locking/release assembly of FIG. 5 viewed generally along line 9-9 of FIG. 7.

FIG. 10 is a view of a dual-binding module of the bicycle carrier of FIG. 1 taken in isolation and including a pair of frame-securing devices.

FIG. 11 is a top view of the dual binding module of FIG. 10.

FIG. 12 is a sectional view of the dual-binding module of FIG. 11, taken generally along line 12-12 of FIG. 11 with the module attached to a tube that is included in an arm of the bicycle carrier.

FIG. 13 is a view of a single-binding module of the bicycle carrier of FIG. 1 taken in isolation and including only one frame-securing device.

FIG. 14 is a sectional view of the single-binding module of FIG. 13, taken generally along line 14-14 of FIG. 13 with the module attached to a tube that is included in an arm of the bicycle carrier.

FIG. 15 is a side view of a two-layer strap for use in a frame-securing device of the bicycle carrier of FIG. 1, with the strap disposed in a preformed shape that forms a pair of legs and positions the ends of the strap wider than the distance between the pair of buckles of the frame-securing device.

FIG. 16 is a bottom, partially fragmentary view of the strap of FIG. 15 taken generally along line 16-16 of FIG. 15 toward the inner side of the strap, with an inner layer of the strap shown only for the left half of the strap.

FIG. 17 is a sectional view of the strap of FIG. 15, taken generally along line 17-17 of FIG. 15 through both layers of the strap.

FIG. 18 is a side view of the mount of the bicycle carrier of FIG. 1 taken in isolation.

FIG. 19 is a top view of selected aspects of the mount of FIG. 18.

FIG. 20 is a partially exploded top view of selected aspects of the mount of FIG. 18 and showing a wedge adapter and a tube adapter that may be attached to the mount for use with a trailer hitch that defines a wider passage for receiving the mount.

FIG. 21 is a partially exploded front end view of selected aspects of the mount of FIG. 18, taken with the mount configuration of FIG. 20.

FIG. 22 is an exploded top view of selected aspects of the mount of FIG. 18.

FIGS. 23-28 are a series of fragmentary top sectional views of selected components of the mount of FIG. 18 as the mount is inserted into and removed from a trailer hitch, in accordance with aspects of the present disclosure.

FIG. 29 is a top fragmentary view of the insertable front portion of the mount of FIG. 18 taken in the absence of adapters and with the wedge member in a retracted configuration that does not provide attachment of the mount to the hitch.

FIG. 30 is a sectional view of the mount of FIG. 18 in the retracted configuration of FIG. 29, taken generally along line 30-30 of FIG. 29.

DETAILED DESCRIPTION

Figure 31:
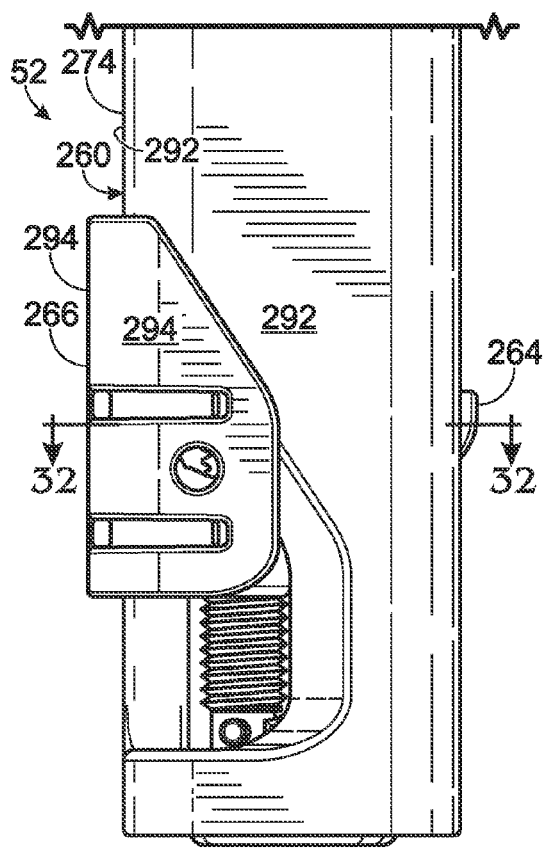
FIG. 31 is another top fragmentary view of the insertable front portion of the mount of FIG. 18 taken as in FIG. 29 after the wedge has been driven along a beveled guide surface defined by a tube of the mount to position part of the wedge radially outward of the tube in a projecting configuration that provides attachment of the mount to the hitch.

The present disclosure provides a carrier that mounts to a vehicle. In some embodiments, the carrier may include a pair of arms to support a bicycle. Each arm may include one or more securing devices each including a strap to contact a frame region of a bicycle and a pair of buckles to fasten the strap over the frame region. In some embodiments, the carrier may include a mount for a vehicle hitch. The mount may include a pair of user-actuated coupling members, such as a wedge member and a retractable retainer, each configured to attach the mount to the hitch. One of the coupling members (e.g., the retainer) may serve as a backup for the other coupling member to improve safety. In some embodiments, the carrier may include a mast that is releasable for backward pivotal motion away from the vehicle.

An exemplary carrier mountable to a vehicle is provided. The carrier may include a mounting portion for attachment to a vehicle. The carrier also may include a pair of arms connected to the mounting portion and configured to support a bicycle. Each arm may include a securing device to fasten a frame region of the bicycle to the arm. Each securing device may include a strap to contact the frame region and a pair of buckles. The strap may have a preformed longitudinal curvature that forms a pair of legs. The pair of legs and the pair of buckles collectively may form a pair of ratchets to adjustably fasten both legs to the pair of buckles. In some embodiments, the strap may have a harder outer side defining a series of ratchet teeth and a softer inner side to contact the frame region of the bicycle. The outer side and the inner side may be formed at least predominantly by an outer layer and an inner layer respectively.

Another exemplary carrier mountable to a vehicle is provided, namely, for a vehicle including a hitch having an open end and defining a transverse aperture. The carrier may include a first portion and a second portion. The first portion may be insertable as a unit into the open end of the hitch and may include a retainer having a retracted configuration that permits travel of the first portion into the hitch and an extended configuration capable of disposing the retainer in the transverse aperture to prevent uncoupling of the inserted first portion from the hitch. The second portion may be configured to remain outside the hitch when the retainer is disposed in the transverse aperture and may include an actuating member manipulable to place the retainer in the retracted configuration. In some embodiments, the carrier also may include an adjustable coupling member to attach the mount to the hitch. The coupling member may be a wedge member.

Still another exemplary carrier mountable to a vehicle is provided, namely, for a vehicle having a hitch. The carrier may include a mount for attachment to the hitch. The carrier also may include a pair of arms configured to support a bicycle. Each arm may include a securing device to fasten a frame region of the bicycle to the arm. The carrier further may include a mast having a bottom end portion pivotally connected to the mount and a top end portion connected to the pair of arms. An actuating member may be connected to the top end portion of the mast. The carrier may include a locking member having a first configuration that blocks backward pivotal motion of the mast and a second configuration that permits the backward pivotal motion. A linkage may extend down the mast from the actuating member to the locking member and operatively connect manipulation of the actuating member to movement of the locking member from the first configuration to the second configuration.

Further aspects of the present disclosure are described in the following sections: (I) overview of an exemplary vehicle carrier system, (II) mast locking/release assembly, (III) bicycle retention system, (IV) hitch mount, and (V) examples.

I. Overview of an Exemplary Vehicle Carrier System

This section provides an overview of an exemplary vehicle-mounted carrier system, namely, a bicycle carrier 50 having a hitch mount 52 and a cargo holder 54; see FIGS. 1-3. The carrier interchangeably may be termed a vehicle carrier system and/or a vehicle rack system. The hitch mount interchangeably may be termed a mount, a mounting portion, and/or a base; and the cargo holder interchangeably may be termed a holding portion or carrying portion.

FIG. 1 shows carrier 50 exploded from a vehicle 56 that provides a hitch 58 (interchangeably termed a trailer hitch, a vehicle hitch, and/or a hitch receiver) at the back of the vehicle. In this view, mount 52 is aligned coaxially with an entry or passage 60 extending into the hitch from an open end 61 thereof. Entry 60 defines a receiving axis 62 for the mount, with the receiving axis oriented parallel to a front-rear axis of the vehicle (typically the long axis and/or travel axis of the vehicle). The mount is adjustable to attach and/or fix the carrier to the vehicle.

Cargo holder 54 may be connected to mount 52 at a pivot joint 64 (interchangeably termed a pivotal connection), which may be a hinge joint. The coupling portion may fix cargo holder 54 to mount 52 for vehicle travel. The pivot joint may be adjustable between a fixed or locked configuration for bicycle loading and transport and a pivotable configuration to allow a user to access the rear of the vehicle (see Section II).

Cargo holder 54 may include a mast 66 connected to a support portion 68. The mast may have a substantially vertical or upright configuration. The mast may extend upward from pivot joint 64 to support portion 68, to elevate the support portion above the pivot joint and mount 52. The support portion may be U-shaped, with a pair of at least generally horizontal arms 70, 72 each extending from a base 74. The arms may (or may not) define parallel axes.

Support portion 68 may form a bicycle retention system 76 to retain at least one bicycle 78 on the arms. (Only an exemplary frame 80 of the bicycle is shown here to simplify the presentation.) Each arm 70, 72 may include a bar member 82 and at least one or a plurality of securing devices 84 each configured to secure a frame region 86 of frame 80 to the bar member (and arm). For example, three securing devices 84 may be used to fasten frame 80 to support portion 68. A securing device 84 provided by each arm may engage a pair of spaced frame regions 86 of frame 80 disposed above bar member 82. The spaced frame regions may be provided by a top portion of the frame 80, such as top tube 88, with the portion arranged transverse (e.g., orthogonal) to the arms. A third securing device 84 of either arm (arm 70 in FIG. 1) may fasten a downwardly extending portion of the frame, such as down tube 90, to function as an anti-sway device for the bicycle.

The securing devices 84 may be provided by a pair of different binding modules 92, 94 (interchangeably termed binding assemblies), respectively including a pair of securing devices 84 (dual-binding module 92) or a single securing device 84 (single-binding module 94). Each arm may include one or more of each module 92 and 94. In the depicted embodiment, each arm has a pair of each type of module 92 and 94 arranged in alternation along the arm. Accordingly, carrier 50 as depicted can receive and secure up to four bicycles using three securing devices for each bicycle. Additional binding modules 92 and 94 may be added (or binding modules removed) to increase (or decrease) the maximum capacity of the carrier.

Carrier 50 may take other forms in other embodiments. For example, carrier may be a trunk-mounted carrier with mounting portion 52 configured to attach the carrier to the trunk of a vehicle. Exemplary aspects of trunk-mounted carriers, including mounting portions, rack structures, and arms, among others, that may be suitable for the carrier of the present disclosure are described in U.S. Pat. Nos. 6,386,407; 6,840,418; 7,404,504; and 7,975,888, which are incorporated herein by reference. Alternatively or in addition, cargo holder 54 may be configured to carry any other types of articles, such as skis, snowboards, one or more boats, surfboards, etc. The cargo holder may provide a rack or a container, among others. In some embodiments, the cargo holder may be a trailer 96, and pivot joint 64 may include a ball joint (e.g., mounting portion 52 may provide a ball portion of the ball joint).

FIG. 2 shows a fragmentary top view of carrier 50 taken in isolation from bicycle frame 80. Each bar member may have a contoured surface 102 that defines a plurality of recesses 104, 106 arranged respectively along the top (recesses 104) a lateral side (recesses 106) of the bar member. Surface 102 may be provided by a cover member 108 of the bar disposed on and attached to a tube 110. Tube 110 may have any suitable cross sectional shape, such as round, square, elliptical, or the like. Further aspects of a contoured surface for the arm and a cover member that may be suitable for the carrier of the present disclosure are described in U.S. Pat. No. 8,210,408, which is incorporated herein by reference.

Recesses 104 and 106 may be aligned pair-wise along each arm to provide one or more receiving regions for frame regions of a bicycle. The recesses may form a fixed array, which may have a uniform spacing of recesses. Binding modules 92 and 94 and/or securing devices 84 may be movable along each arm for alignment with a selected recess of the bar member (and each other). (The eight binding modules of FIG. 2 are shown with each aligned with (e.g., centered on) one of recesses 104.) Alternatively, each binding module and/or securing device may have a fixed position along the arm that is not adjustable by the user. Further aspects of securing devices 84 and binding modules 92 and 94 are described elsewhere in the present disclosure, such as in Section III.

FIG. 3 shows a left side view of bicycle carrier 50, taken in isolation from the bicycle. Each arm may slope upward in a direction away from mast 66.

II. Mast Locking/Release Assembly

This section describes an exemplary adjustable locking/release assembly 120 of carrier 50 that allows mast 66 of the carrier to be adjusted between fixed and a pivotable (or tiltable) configurations; see FIGS. 4-9.

FIG. 4 shows a side view of bicycle carrier 50 with exemplary storage and tilted configurations depicted in phantom lines and identified at 122 and 124, respectively. Carrier 50 may have a transport configuration, indicated at 126, and defined by a fixed geometry of mount 52, mast 66, and support portion 68 relative to one another. The carrier may be adjusted from fixed transport configuration 126 to various adjustable configurations by manual manipulation of a pair of actuators 128, 130 (interchangeably termed actuating members), each of which may (or may not) be a lever.

Arm pivot actuator 128 may be manipulable to unlock a pivotal connection 132 that connects mast 66 to support portion 68. Actuator 128 may be configured to be engaged by hand and repositioned to release support portion 68 from its fixed connection to mast 66, such that support portion 68 becomes pivotable with respect to the mast. Arms 70 and 72 then may be pivoted as a unit downward, indicated by an arrow at 134, to collapse the carrier to storage configuration 122.

Mast pivot actuator 130 may be manipulable to unlock pivot joint 64 that connects mount 52 to mast 66. Actuator 130 may be configured to be engaged by hand and repositioned, indicated by an arrow at 136, to release mast 66 from its fixed connection to mount 52, such that mast 66 becomes pivotable with respect to mount 52. The mast (and support portion 68) then may be pivoted as a unit, indicated by an arrow at 138, backward away from the vehicle to allow access to the trunk of the vehicle via the trunk lid or hatch of the vehicle, among others. Carrier 50 may be placed in storage configuration 122 before the mast is tilted, as illustrated in FIG. 4, or the mast may be unlocked and pivoted without collapsing the arms. Generally, it may not be desirable to pivot the mast when the mast is loaded with bicycles, because the mast can be difficult to control with the added weight. The user may be discouraged from releasing the mast when the arms are supporting bicycles if the pivot actuator is obscured and/or rendered relatively inaccessible by the bicycles. For example, arm pivot actuator may be mounted on the back side of mast 66 and near support portion 68, as shown in the depicted embodiment, which makes the actuator more difficult to see and reach when bicycles are present on the arms.

FIGS. 5-9 depict mast locking assembly/release in more detail. The assembly may include actuator 130, a locking member 150, and a linkage 152 that operatively connects the actuator to the locking member. Actuator 130 and locking member 150 may be disposed respectively in an upper half and a lower half of the mast (as determined by length), such as at a top end portion and a bottom end portion of the mast. Linkage 152 may extend downward along the mast from the actuator to the locking member. In some embodiments, the linkage may extend along a majority of the length of the mast, such as from the top end portion to the bottom end portion of the mast. In the depicted embodiment, linkage 152 extends along a channel defined by a mast tube 153 that forms a body of the mast. The linkage interchangeably may be termed a link member and/or a link and may be formed as a single-piece or a multi-piece connecting structure.

Actuator 130 may be mounted to mast 66 with a pivot pin 154 (see FIGS. 5 and 6). An exposed region 156 of the actuator may extend from the pivot pin to a position outside the mast, to allow the actuator to be contacted and manipulated with a user's hand. A connecting region 158 of the actuator may extend from the opposite side of the pivot pin inside the mast for connection to linkage 152 with another pivot pin 160. Connecting region 158 may form a hook 162 to receive pivot pin 160 (also see FIG. 8).

Linkage 152 may connect to locking member 150 at the bottom end of the linkage (see FIGS. 5 and 9). For example, the linkage may define one or more link apertures 164 to receive the locking member. In the depicted embodiment, the linkage is U-shaped in cross-section and has a pair of flanges or ribs 166 each defining one of link apertures 164 (see FIGS. 6, 8, and 9).

Locking member 150, which may be termed a locking pin, may extend through aligned apertures 164, 168 and 170 defined respectively by linkage 152, mast 66, and mount 52 (see FIGS. 5, 7, and 9). For example, a pair of mast apertures 168 may be defined by a bottom end region or base 172 of the mast, and a pair of mount apertures 170 may be defined by a pair of fixed brackets 174 projecting upward from a lower portion of the mount (also see FIG. 18). Mount apertures 170 each may have an incompletely bounded perimeter such that the aperture opens radially outward (e.g., upward as shown here) from the pivot axis defined by pivot joint 64. The locking member may be urged into mount apertures 170 by at least one biasing member, such as one or more springs 176 (see FIGS. 7 and 9).

Locking member 150 may be movable by manipulation of actuator 130 to adjust mast 66 from a fixed or locked configuration to a pivotable configuration. Actuator 130 may be pivoted to urge linkage 152 upward, which lifts locking member 150 out of mount apertures 170 to an elevated position in each elongated mast aperture 168. The locking member no longer prevents pivotal motion of the mast while in the elevated position. Accordingly, the mast can be pivoted backward away from the vehicle until base 172 of the mast reaches a travel stop or shoulder 178 formed by one or more brackets 174 of mount 52, which may support the mast at a maximum tilt permitted. Locking member 150 can travel with the mast as the mast is being pivoted. For example, the locking member can travel along the perimeter of each bracket 174 between mount apertures 170 and travel stops 178. The mast can be returned to an upright orientation by pivoting the mast toward the vehicle until mast apertures 168 are arranged coaxially with mount apertures 170. This pivotal return of the mast may urge locking member 150 to a position that is radially aligned with mount apertures 170. Springs 176 then may urge the locking member back into mount apertures 170, to fix mast 66 in the upright transport orientation. Further aspects of a tiltable mast that may be suitable for the carrier of the present disclosure are described in U.S. Pat. No. 8,235, 268, which is incorporated herein by reference.

III. Bicycle Retention System

This section describes an exemplary retention system 76 of carrier 50 that may be utilized to secure the frame of one or more bicycles to the arms of the carrier; see FIGS. 10-17.

FIGS. 10-12 shows dual-binding module 92 of carrier 50. Module 92 may include a pair of upper and lower securing devices 84a, 84b each including a base 190, a pair of buckles 192 mounted to the base, and a strap 194 having a pair of free end regions or legs 196 each fastenable with one of the buckles. Base 190 may form a cradle 198 to receive a frame region of the bicycle. The cradle may be transversely concave and may be convex in a direction orthogonal to a plane defined by the strap. (The cradle interchangeably may be termed a saddle.) The frame region of the bicycle may be contacted on opposite sides by cradle 198 and a junction region 200 of the strap. Junction region 200 connects legs 196 to one another and may be arcuate, extending along a curved path from one leg to the other leg.

In some embodiments, the cradle may be provided alternatively or in addition by contoured surface 102 of bar member 82 of the arm (see FIGS. 2 and 3). For example, each top recess 104 may form a cradle to receive a bottom region of the top tube of a bicycle, and each lateral recess 106 to receive a side region of the down tube of a bicycle.

FIGS. 10 and 11 show further aspects of buckles 192 and strap 194. Each leg may be connected to one of buckles 192 to form a ratchet 202 that fastens the leg to the buckle. Each strap may define a plurality of strap teeth 204 arranged along an outer side of each leg. Each of the teeth may be asymmetrical, with a less steeply-sloped tooth side facing away from junction region 200 and a more steeply-sloped tooth side facing generally toward the junction region. Each buckle 192 may include a pivotally-mounted pawl 206 (interchangeably termed a tongue) of ratchet 202 to restrict longitudinal advancement of each leg through the buckle in only one of two axial directions, namely, the axial direction that moves junction region 200 of the strap away from cradle 198 (to loosen or uncouple the strap). The pawl may have one or more pawl teeth 208 each configured to be received between a pair of strap teeth 204 (each pawl has two teeth in the depicted embodiment). Strap may be tightened at least in part by application of pressure to the outer side of junction region 200 at a central site 210.

Securing devices 84a and 84b may be pivotally connected to each other by a pivot pin 212 defining a pivot axis 214 arranged parallel to the long axis of the corresponding arm 70 or 72 (see FIGS. 10-12). In other embodiments, the securing devices may be fixed to each other such that the relative orientations of the securing devices cannot be changed relative to one another by the user after the carrier is assembled.

Dual-binding module 92 may include a mounting portion 216 for attachment of the module to bar member 82 of one of arms 70 or 72 (also see FIG. 2). The mounting portion may be pivotally connected or fixed to each securing device 84a and 84b. For example, in the depicted embodiment upper securing device 84a is fixedly attached to mounting portion 216, and lower securing device 84b is pivotally connected to the mounting portion via pivot pin 212. The lower securing device may be pivotally adjusted by about one-eighth turn or less (e.g., about 45, 30, or 20 degrees) to orient the plane of strap 194 orthogonal to the axis of the bicycle frame region to be engaged with the strap (e.g., based on the frame configuration (such as the slope of the down tube) of the particular bicycle to be carried). This pivotal adjustment allows the inner side of the strap to be abutted with the surface of the frame region for optimal engagement. The lower securing device may be pivotally adjusted by about one-quarter turn to adjust binding module 92 between locked and slidable configurations. The lower securing device further may be pivotally adjusted by about one-half turn to move the lower securing device between a deployed position (as in FIGS. 10-12) and a stowed position in which cradles 198 are adjacent each other. Mounting portion 216 may be fixed or slidable in the stowed position.

Mounting portion 216 may be configured to be received in tube 110 of bar member 82 of either arm (see FIGS. 10-12). The mounting portion may define a pair of channels 218 each having a width that corresponds to the thickness of the bottom wall of tube 110. The tube may define an axial slot 220 in the bottom wall. A top region of mounting portion 216 may be received in tube 110, with the mounting portion extending vertically through the slot. Bottom wall regions of tube 110 that opposingly flank the slot may be received in respective channels 218.

Slot 220 may be structured to permit mounting portion 216 to be fixed to tube 110. The slot may have reflectional symmetry across a vertical plane containing the long axis of the slot. Also, the slot may vary in width at regular intervals to form a pair of uniformly-spaced arrays of teeth on opposite sides of the slot. The slot may widen, intermediate adjacent pairs of teeth, to form an array of seating positions, which may be aligned with each of recesses 104.

Mounting portion 216 may (or may not) have a slidable configuration that permits the mounting portion (and module 92) to slide along tube 110, to customize the position of the module along the arm. The mounting portion also may have a fixed configuration that fixes the mounting portion (and module 92) at a selectable position along the arm. Motion of mounting portion 216 may be restricted by an arrest member 222 attached to a flexible cantilever 224. The arrest member may be urged upward into engagement with tube 110 by a cam 226 eccentrically arranged around pivot axis 214 and provided by lower securing device 84*b*. Pivotal motion of the lower securing device, which serves as an actuator for arrest member 222, may adjust the elevation of arrest member 222, to move the arrest member into and out of engagement with tube 110. In particular, the pivotal position of the securing device may move arrest member 222 between a less elevated, disengaged configuration that permits the mounting portion to slide, and a more elevated, engaged configuration that fixes the mounting portion to tube 110. Arrest member 222 may have a spherical contact surface that engages opposing edges of the slot. The spherical contact surface may be seatable between adjacent pairs of the teeth of slot 220 to fix the axial position of the mounting portion along the arm.

FIGS. 13 and 14 show single-binding module 94 of carrier 50. Module 94 may include only a single securing device 84, which may be structured and positioned like upper securing device 84*a* of dual binding module 92. The securing device of module 94 may be fixedly attached to mounting portion 216, as in module 92. However, in contrast to module 92, the mounting portion of module 94 may be adjusted between slidable and fixed configurations by manipulation of a simple actuator 228 rather than with another securing device (i.e., securing device 84*b* of module 92). As in module 92, actuator 228 may include a cam 230 to move arrest member 222 into and out of engagement with tube 110 by pivoting the actuator, to respectively lock and unlock mounting portion 216. Further aspects of bicycle securing devices and their attachment to arms of a carrier, which may be suitable for the carrier of the present disclosure, are described in U.S. Pat. No. 8,210,408, which is incorporated herein by reference. Further aspects of a wheel binding device that may be suitable for the frame-securing devices and frame-binding modules of the present disclosure are described in U.S. Pat. No. 6,425,509, which is incorporated herein by reference.

FIG. 15 shows a side view of a strap 194 before the strap is inserted into the buckles of a securing device 84. The strap may have a preformed longitudinal curvature that causes the strap to extend along a nonlinear path between legs 196. The preformed curvature may be present in junction region 200, which causes legs 196 to extend along different axes from the junction region. For example, legs 196 may extend on spaced parallel paths or on divergent (or convergent) nonparallel paths as shown in FIG. 15. The nonparallel paths may be orthogonal or oblique to one another. The longitudinal shape of the strap may enable the strap to be molded without an undercut (e.g., at strap teeth 204) that would impede removal of the strap from the mold.

The strap may have a different shape when the strap is not connected to the buckles, compared to the strap fastened to the buckles. Legs 196 may be more divergent (i.e., may be more spread apart to define a larger angle) when the strap is separate from the buckles (compare FIG. 15 to FIG. 11). Accordingly, to assemble the strap with a securing device, a user may need to deform the strap, to urge the legs closer to each other, in order to mate both legs with both buckles of a securing device. In other words, the strap may be elastically and/or plastically deformed to connect the strap to both buckles of the securing device. Elastic deformation causes the legs of the strap to be biased away from each other. As a result, the outer, toothed side of each leg may be urged toward the corresponding pawl 206, which may improve the performance of each ratchet 202 (see FIGS. 10 and 11). After the strap is mated with the buckles, legs 196 may be parallel to each other or nonparallel (e.g., less divergent as in FIG. 11).

FIGS. 15-17 show further aspects of strap 194. The strap may have an outer layer 240 and an inner layer 242 attached to each other. The outer layer may form an outer surface region and/or at least a majority of an outer side 244 of the strap that defines strap teeth 204 for fastening the strap to each buckle of the securing device. The inner layer may provide an inner surface region and/or at least a majority of an inner side 246 of the strap to contact and grip a bicycle frame. Accordingly, the outer layer and inner layer may be formed of distinct materials having different material properties suitable for the function of each layer.

Outer layer 240 may be harder than inner layer 242. A harder outer layer may allow the strap teeth of each leg to perform effectively in each ratchet without slippage. A softer inner layer may be more gentle on the frame of the bike, to reduce any tendency of the strap to mar or scratch the surface of the bicycle frame as the bicycle is transported. In exemplary embodiments, outer layer 240 may have a Shore D durometer value of greater than 50, such as 55-70, or 60-65, among others; and inner layer may have a Shore D durometer value of less than 40, 30, or 20, among others. The inner layer may have a Shore A durometer value of 80 or less, such as 55-80, 60-75, or 60-70, among others. Outer layer 240 may have a Shore A durometer value of at least 90, 95, or 99, among others.

Inner layer 242 may be formed of a higher friction material than outer layer 240. For example, the inner layer may have a higher coefficient of friction than the outer layer, each measured on steel. The higher friction material may be capable of gripping the bicycle frame more efficiently than a lower friction material forming the outer side of the strap. As a result, the bicycle may be held in a more stable configuration, with less tendency to slip, slide, or rock, among others, and thus with less tendency to damage the bicycle frame or create other motion-associated concerns.

Outer and inner layers 240 and 242 each may be formed of a polymer. The outer layer may, for example, be formed of a polyester (such as a polyester blend) or other harder plastic, and the inner layer of an elastomer (such as a thermoplastic elastomer), among others.

Outer layer 240 may be molded first to form a substrate on which inner layer 242 may be overmolded (see FIGS. 16 and 17). The outer layer may define a recessed inner surface region 250 that extends longitudinally to a leader 252 at each end of the strap. The leader may be nontoothed along a majority of its length. Inner surface region 250 may have a plurality of recesses 254, such as elongate concavities, formed therein. Recesses 254 may increase the strength of attachment of the layers to each other. In some examples, the recesses can be omitted because the material of the inner layer can bond directly to the material of the outer layer. In other embodiments, the inner layer may be formed separately from the outer layer and then attached to the inner layer after formation, such as with an adhesive, solvent, heat, pressure, ultrasonic energy, radiofrequency radiation, or any combination thereof, among others.

Inner layer 242 may have any suitable dimensions. The inner layer may extend along a majority of the length of the strap, such as along a majority of the length of each leg (e.g., along the toothed region of each leg). The inner layer may (or may not) extend continuously from one leg to the other leg. The inner layer may be shorter than the outer layer or may be the same length as the outer layer. The inner layer may have the same width as the outer layer or may be wider or narrower. The inner layer may (or may not) be thinner than the outer layer (as measured with or without the teeth).

IV. Hitch Mount

This section describes an exemplary hitch mount 52 of carrier 50 for attaching the carrier to a hitch 58 of a vehicle; see FIGS. 18-32.

FIGS. 18 and 19 show respective top and side views of mount 52, with fixed brackets 174 omitted from FIG. 19 to simplify the presentation. Mount 52 may include a front portion 260 and a rear portion 262.

Front portion 260 may form a leading end of the mount and may be insertable as a unit into the open end of a hitch. The front portion may be sized and shaped in correspondence with the hitch. For example, the front portion may be at least generally square in cross-section with rounded corners and a width of 1¼ or 2 inches (31.75 mm or 50.8 mm) for placement in either a 1¼-inch or 2-inch hitch, among others. Front portion 260 may include a pair of adjustable coupling members, such as a retainer 264 (interchangeably termed a safety pin) and a wedge member 266. The coupling members each may be adjustable by user manipulation of a distinct actuator to attach mount 52 to the hitch. Each coupling member may (or may not) be actuable independently of each other for attachment of the mount to the hitch. In some examples, the wedge member may provide a primary mechanism for coupling the mount to the hitch. The retainer may provide a safety backup that prevents uncoupling of the mount from the trailer hitch if the primary mechanism fails, loosens, or is never actuated properly. Each of these aspects is described in more detail below.

Rear portion 262 extends rearward from front portion 260, away from the hitch and vehicle, after mount 52 is attached to the hitch. The rear portion generally does not enter the hitch, but instead remains outside the hitch. Rear portion 262 may include a retainer actuator 268 to adjust the position of retainer 264 and a wedge actuator 270 to adjust the position of wedge member 266. The rear portion also may have an indicator 272 that provides to the user a visual indication of the position of retainer 264.

A tube 274 may extend from front portion 260 to rear portion 262 and may function as a primary structural member of the mount. Each of retainer 264, wedge member 266, retainer actuator 268, and wedge actuator 270 may be connected to and supported by tube 274.

FIGS. 19 to 21 show additional aspects of front portion 260. Mount 52 may have a pair of removable adapters, namely, a tube adapter 276 and a wedge adapter 278, that respectively increase the cross-sectional size of tube 274 and wedge member 266. Adapters 276 and 278 may be attached respectively to tube 274 and a base wedge 280 of wedge member 266 with fasteners 282 if the mount is to be installed in a wider hitch, and are not used with a narrower hitch. In other words, wedge member 266 may be provided by base wedge 280 alone, or the base wedge plus the wedge adapter in different assembled configurations of the mount.

FIG. 22 shows an exploded top view of selected aspects of mount 52. A lead screw 284 (interchangeably termed a drive screw or a screw) may extend from wedge actuator 270 (see FIG. 19), through tube 274, to base wedge 280. The base wedge may define an internally threaded aperture 286 that is disposed in threaded engagement with an external thread 288 formed at the front end of lead screw 284. Rotation of wedge actuator 270 turns lead screw 284, which drives motion of base wedge 280 along lead screw 284.

Tube 274 may define an oblique guide surface 290 on which a correspondingly oriented oblique surface 291 of wedge member 266 slides as the wedge member travels along lead screw 284. Guide surface 290 may define a plane oriented obliquely to a long axis of tube 274. The plane may be oblique to each of the planar outer sides of walls 292 of tube 274. Wedge member 266 may have a pair of planar sides 294 arranged orthogonally to each other and obliquely to oblique surface 291. Each of planar sides 294 may be oriented parallel to an adjacent outer side of a pair of the walls 292 of the tube when the wedge member is abutted with guide surface 290. Wedge member 266 can be driven up guide surface 290 by turning lead screw 284 to move a portion of the wedge member outside the periphery of the tube. This repositioning of the wedge member expands the front portion of the mount by increasing the cross-sectional size of the mount at the wedge member. In this way, the front portion of the mount may be wedged against each of four planar wall surfaces present inside the hitch.

Guide surface 290 of tube 274 may be formed by a cutout region of tube 274 defining an aperture 300 that is spaced from the front boundary perimeter of the tube, as shown here. The aperture may be formed in a pair of adjacent side walls of the tube and may have a closed perimeter, as shown here. Aperture 300 may be sized and shaped to receive base wedge 280 such that the base wedge does not project outside the periphery of tube 274. Guide surface 290 may at least partially bound aperture 300. In other embodiments, guide surface 290 may be formed by an oblique surface at the front boundary of the tube.

An insert 310 may be disposed inside tube 274. The insert may define an axial passage 312 to receive lead screw 284 and may serve as a support for a biasing member 314 (e.g., a spring, such as a torsion spring), retainer 264, and a force transmitter 316 (which may be termed a connecting member).

Biasing member 314 may be attached to insert 310 at one end of the biasing member and may have a pair of arms 318 projecting to the opposite end. The arms may contact retainer 264 and force transmitter 316, to bias the position of each.

Retainer 264 may be received in a cavity 320 defined by insert 310 and arranged coaxially with an aperture 322 defined by tube 274. Biasing member 314 may be configured to urge a blocking projection 324 of retainer 264 from aperture 322 to a position outside of tube 274. Projection 324 may have an asymmetrical profile, to form a beveled front side 326 and an orthogonal rear side 328. The beveled front side interchangeable may be termed a chamfered surface region.

Force transmitter 316 may be pivotally mounted to insert 310 with a pivot pin 330. Biasing member 314 may contact an end of transmitter 316 to urge the end away from the long axis of the tube (i.e., to urge counterclockwise motion of transmitter 316 in the view of FIG. 22).

Actuator 268 and indicator 272 each may extend into a pair of respective apertures 332, 334 defined in the same side wall of tube 274. Actuator 268 may have a head 336 forming a pressable region or button, and a stem 338 extending into aperture 332. The stem may be configured to be contactable with transmitter 316 to urge the transmitter away from its biased position. Indicator 272 may extend through a fixed sleeve 340, aperture 334, and into an aperture 342 defined by transmitter 316 for connection of the indicator to the transmitter. The axial position of indicator 272 with respect to sleeve 340 may be determined by the position of transmitter 316. In other words, as transmitter pivots, the length and/or appearance of an external portion 344 that is visible outside sleeve 340 changes. Furthermore, since the position of the indicator may be coupled to the position of retainer 264, the indicator may provide a visual indication to the user of the position of retainer 264. The visual indication may show when the retainer is in an extended configuration and/or a retracted configuration.

Each of sleeve 340 and actuator 268 may be connected to tube 274 with a housing 346. The housing may be attached to the tube with one or more fasteners, such as a pair of rivets 348, received in apertures 350.

FIGS. 23-28 show a series of fragmentary top sectional views of selected components of mount 52 as the mount is inserted into and removed from a hitch 58. In these views, wedge member 266, wedge actuator 270, lead screw 284, and insert 310 (see FIGS. 19 and 22), among others, are not shown to simplify the presentation.

FIG. 23 shows mount 52 aligned coaxially with hitch 58 before the mount has entered the hitch. The hitch (e.g., a sleeve thereof) may define a transverse aperture 360 formed in and extending through a wall of the hitch to communicate with passage 60. The transverse aperture may define an axis that is transverse (e.g., orthogonal) to receiving axis 62 defined by entry 60. Trailer hitches commonly are manufactured to have a transverse aperture for receiving a hitch pin.

Mount 52 is shown ready to be inserted into hitch 58 along receiving axis 62. The action of biasing member 314 is holding retainer 264 in an extended configuration in aperture 322 of tube 274 such that at least part of projection 324 is positioned outside tube 274. Force transmitter 316 is also being held in its biased position by the biasing member. Positionally-coupled indicator 272 is projecting out of sleeve 340 such that the indicator is visible to a user. The stem of actuator 268 may (or may not) be in contact with transmitter 316.

FIG. 24 shows mount 52 advanced partway into hitch 58 with beveled front side 326 of retainer 264 abutted with an inside edge of the hitch formed between an inside of a hitch wall and a rearward facing end wall 362 of hitch 58. As the mount is advanced further, indicated by an arrow at 364, beveled front side 326 functions as a ramp that converts part of the longitudinal force of advancement to a transverse force that urges retainer 264 inward into the tube, indicated by an arrow at 366, to move the retainer to a retracted configuration (compare FIGS. 24 and 25). Movement of the retainer deforms biasing element 314, which drives pivotal motion of transmitter 316, indicated by an arrow at 368 (compare FIGS. 24 and 25). As the transmitter moves, it brings indicator 272 inward, indicated by an arrow at 370.

FIG. 25 shows mount 52 advanced further into hitch 58. Retainer 264 does not substantially impede travel of the mount into the hitch because projection 324 of the retainer is flush with the outside of one of walls 292 of tube 274. Indicator 272 has a visibly distinct appearance or is no longer visible, indicating to the user that the mount has not yet been advanced to a retained position, and is not yet ready for adjustment of the wedge member to fix the tube in place. The mount may be advanced even further into hitch 58, indicated by an arrow at 372.

FIG. 26 show mount 52 fully advanced into hitch 58 with aperture 322 of tube 274 overlapping transverse aperture 360 of the hitch. Aperture 360 permits the return of retainer 264 to an extended configuration that disposes projection 324 in aperture 360. The rear side of projection 324 can engage a rear perimeter region of aperture 360, if the mount is urged rearward, to obstruct removal of the mount from the hitch. The return of biasing member 314 to a less deformed configuration drives transmitter 316 and connected indicator 272 toward their biased positions, which visibly changes the appearance of the indicator. The indicator now shows that the retainer has an extended configuration at a retaining position in the hitch and that wedge actuator 270 can be manipulated to drive wedge member 266 into engagement with the inside planar regions of the walls of the hitch, to fix the mount to the hitch (see FIGS. 19 and 22).

FIG. 27 shows mount 52 immediately before retainer 264 is retracted for removal of the mount from the hitch. The wedge member already has been driven out of wedged contact with the hitch, which permits the retainer to be retracted (see below). Retainer actuator 268 may be manipulated (e.g., pressed), indicated by an arrow at 374, to move retainer 264. More particularly, pressing the actuator may apply a torque to transmitter 316, indicated by an arrow at 376, via pressure exerted by actuator stem 338. As a result, indicator 272 may move inward, indicated by an arrow at 378, and biasing member 314 may be deformed, which urges retainer 264 inward, indicated by an arrow at 380.

FIG. 28 shows mount 52 traveling out of hitch 58, indicated by an arrow at 382. Retainer 264 has traveled far enough from transverse aperture 360 to be held in a retracted configuration by the adjacent wall of hitch 58. Accordingly, retainer actuator 268 can be released, if desired, and the mount removed from the hitch.

FIG. 29 shows the leading end of front portion 260 of mount 52 with wedge member 266 in a retracted configuration. Planar sides 294 of the wedge member are flush with the outer planar surface regions of walls 292 of tube 274 and will not interfere with insertion of the mount into a hitch. Retainer 264 is also in a retracted configuration (produced by manipulation of retainer actuator 364 (see FIGS. 27 and 28)) and does not project outward of tube 274. The entire retainer may be disposed in the tube (see FIG. 30).

FIG. 30 shows a sectional view of the mount configuration of FIG. 29. Retainer is held in a retracted configuration by arms 318 of the biasing member received in opposing recesses 384 defined by the retainer. The retainer also may define a cylindrical recess 386 opposite projection 324 that allows the retainer to be received over lead screw 284.

FIG. 31 shows the leading end of front portion 260 of mount 52 with wedge member 266 in a projecting configuration in which the wedge member projects outside the tube. Planar sides 294 of the wedge member are disposed outward of outer sides of walls 292 of tube 274. Retainer 264 projects out of tube 274.

Figure 32:
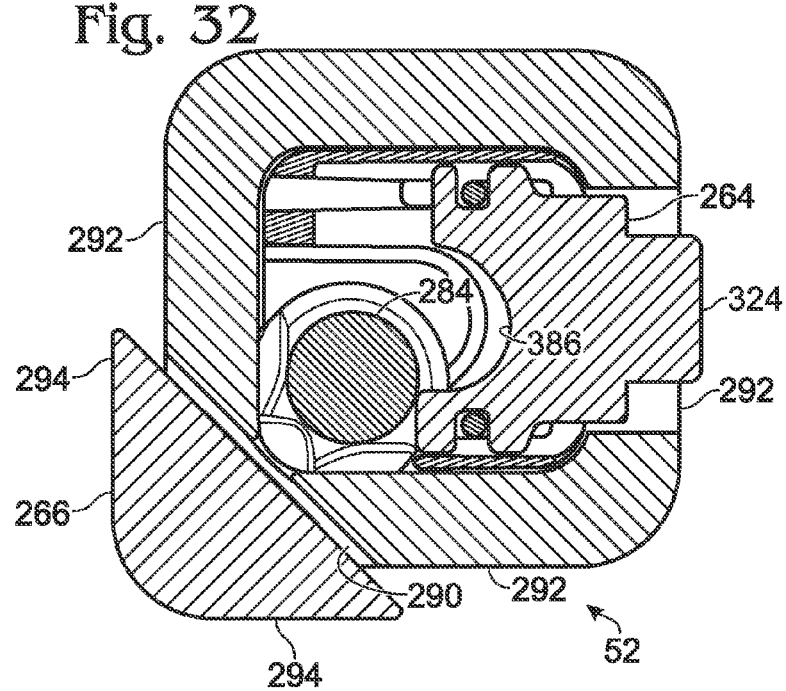
FIG. 32 is a sectional view of the mount of FIG. 18 in the projecting configuration of FIG. 31, taken generally along line 32-32 of FIG. 31.

FIG. 32 shows a sectional view of the mount configuration of FIG. 31. Retainer 264 is obstructed by lead screw 284 from being retracted to a position flush with the adjacent outside side of wall 292 of tube 274. The lead screw has moved off-center by travel of wedge member 266 along guide surface 290, which offsets the lead screw from cylindrical recess 386. As a result, retainer 264 is even less likely to be forced to a retracted configuration during vehicle travel, improving the reliability of retainer 264 as a safety backup to prevent mount uncoupling.

Further aspects of mounts, such as tubes, wedges, and lead screws, that may be suitable for the mount of the present disclosure are described in U.S. Pat. Nos. 5,244,133; 5,685,686; 7,004,491, which are incorporated herein by reference.

V. Examples

This section describes exemplary embodiments of the present disclosure as a series of indexed paragraphs.

1. A carrier mountable to a vehicle, comprising: (A) a mounting portion for attachment to a vehicle; and (B) a pair of arms connected to the mounting portion and configured to support a bicycle, each arm including a securing device to fasten a frame region of the bicycle to the arm, each securing device including a strap to contact the frame region and a pair of buckles, the strap having a preformed longitudinal curvature that forms a pair of legs, the pair of legs and the pair of buckles collectively forming a pair of ratchets to adjustably fasten both legs to the pair of buckles.

2. The carrier of paragraph 1, wherein the strap has a harder outer side defining a series of ratchet teeth along each leg and a softer inner side to contact the frame region.

3. The carrier of paragraph 2, wherein the strap includes a first layer and a second layer each formed of different material, and wherein the first layer forms a majority of the outer side and the second layer forms a majority of the inner side.

4. The carrier of paragraph 3, wherein the second layer is overmolded on the first layer.

5. The carrier of paragraph 3, wherein the second layer is softer than the first layer.

6. The carrier of paragraph 5, wherein the first layer has a Shore A durometer value of at least 95, and wherein the second layer has a Shore A durometer value of less than 80.

7. The carrier of paragraph 5, wherein the first layer has a Shore D durometer value of greater than 50, and wherein the second layer has a Shore A durometer value of less than 80.

8. The carrier of paragraph 3, wherein the first layer is formed of a lower friction material than the second layer.

9. The carrier of paragraph 8, wherein the first layer has a lower coefficient of friction than the second layer when each coefficient of friction is measured on steel.

10. The carrier of paragraph 1, wherein one of the arms has a pair of the securing devices configured to secure distinct frame regions of the same bicycle.

11. The carrier of paragraph 1, wherein each securing device is slidable along one of the arms and fixable on the arm.

12. The carrier of paragraph 1, wherein each securing device includes a cradle to receive a frame region of the bicycle.

13. The carrier of paragraph 1, one of the arms includes a pair of securing devices pivotally connected to each other and configured to receive a pair of frame regions of the same bicycle.

14. The carrier of paragraph 13, wherein a first securing device of the pair is configured to receive a horizontally-oriented frame region of the bicycle, and wherein a second securing device of the pair is configured to receive a downwardly extending frame region of the bicycle.

15. The carrier of paragraph 14, wherein the horizontally-oriented frame region is provided by a top tube of the bicycle, and wherein the downwardly-extending frame region is provided by a down tube of the bicycle.

16. The carrier of paragraph 13, wherein the pair of securing devices are provided by a same module.

17. The carrier of paragraph 1, wherein each arm includes a bar member having a contoured surface that forms an array of cradles arranged along the bar member.

18. The carrier of paragraph 17, wherein each bar forms a first array of cradles arranged along the top of the bar member and a second array of cradles arranged long a lateral side of the bar member and aligned with the first array.

19. The carrier of paragraph 1, wherein the mounting portion is mountable to a vehicle hitch having an open end and defining a transverse aperture, wherein the mounting portion includes a first portion and a second portion, wherein the first portion is insertable as a unit into the open end of the hitch and includes a retainer having a retracted configuration that permits travel of the first portion into the hitch and an extended configuration capable of disposing the retainer in the transverse aperture to prevent uncoupling of the inserted first portion from the hitch, and wherein the second portion is configured to remain outside the hitch when the retainer is disposed in the transverse aperture and includes an actuating member manipulable to place the retainer in the retracted configuration.

20. The carrier of paragraph 19, wherein the actuating member is a first actuating member, wherein the second portion includes a second actuating member, and wherein the first portion includes a coupling member that is adjustable by manipulation of the second actuating member to attach the inserted first portion to the hitch.

21. The carrier of paragraph 20, wherein the coupling member includes a wedge member.

22. The carrier of paragraph 19, wherein a tube extends from the first portion to the second portion, and wherein the retainer is disposed inside the tube in the retracted configuration and extends outside the tube in the extended configuration.

23. The carrier of paragraph 19, wherein the actuating member is a first actuating member, wherein a lead screw extends from the first portion to the second portion and is operatively connected to a second actuating member that allows a user to turn the lead screw, and wherein a wedge member is disposed in threaded engagement with the lead screw and movable by manipulation of the second actuating member to attach the mount to the hitch.

24. The carrier of paragraph 19, wherein the retainer is biased toward the extended configuration.

25. The carrier of paragraph 14, wherein the retainer has a chamfered surface region configured to contact the hitch as the retainer is entering the hitch, to urge the retainer to the retracted configuration.

26. The carrier of paragraph 19, wherein the second portion includes an indicator configured to visibly indicate to a user that the retainer is in the extended configuration.

27. The carrier of paragraph 1, wherein the mounting portion is mountable to a vehicle hitch defining a transverse aperture, wherein the mounting portion comprises: (A) a tube including a first portion that is insertable into the hitch while a second portion of the tube remains rearward of the hitch; (B) a retainer disposed in the first portion of the tube and being retractable into the tube to permit travel of the first portion into the hitch and being extendable from the tube into the transverse aperture to prevent removal of the first portion from the hitch; and (C) a wedge member connected to the tube and adjustable to engage an inside surface of the hitch to attach the tube to the hitch.

28. The mount of paragraph 27, further comprising an actuating member connected to the second portion of the tube and manipulable to retract the retainer into the tube.

29. The carrier of paragraph 1, wherein the carrier includes a mast that connects the mounting portion to the pair of arms.

30. The carrier of paragraph 29, wherein the mounting portion is configured to be attached to a vehicle hitch, and wherein the mast has a bottom end portion pivotally connected to the mounting portion and a top end portion connected to the pair of arms, the carrier further comprising: (A) an actuating member connected to the top end portion of the mast; (a locking member having a first configuration that blocks backward pivotal motion of the mast and a second configuration that permits backward pivotal motion; and (B) a linkage extending down the mast from the actuating member to the locking member and operatively connecting manipulation of the actuating member to movement of the locking member from the first configuration to the second configuration.

31. The carrier of paragraph 30, wherein the linkage extends down a majority of the length of the mast.

32. A carrier mountable to a vehicle, comprising: (A) a mounting portion for attachment to a vehicle; and (B) a pair of arms connected to the mounting portion and configured to support a bicycle, each arm including a securing device to fasten a frame region of the bicycle to the arm, each securing device including a strap and a pair of buckles, the strap having a preformed longitudinal curvature that forms a pair of legs, the pair of legs and the pair of buckles collectively forming a pair of ratchets to adjustably fasten both legs to the pair of buckles, the strap also having a harder outer side defining a series of ratchet teeth along each leg and a softer inner side to contact the frame region.

33. The carrier of paragraph 32, wherein the strap includes a first layer and a second layer each formed of different material, and wherein the first layer forms a majority of the outer side and the second layer forms a majority of the inner side.

34. The carrier of paragraph 33, wherein the second layer is overmolded on the first layer.

35. The carrier of paragraph 33, wherein the second layer is softer than the first layer.

36. The carrier of paragraph 35, wherein the first layer has a Shore A durometer value of at least 95, and wherein the second layer has a Shore A durometer value of less than 80.

37. The carrier of paragraph 35, wherein the first layer has a Shore D durometer value of greater than 50, and wherein the second layer has a Shore A durometer value of less than 80.

38. The carrier of paragraph 33, wherein the first layer is formed of a lower friction material than the second layer.

39. The carrier of paragraph 38, wherein the first layer has a lower coefficient of friction than the second layer when each coefficient of friction is measured on steel.

40. The carrier of paragraph 32, wherein one of the arms has a pair of the securing devices configured to secure distinct frame regions of the same bicycle.

41. The carrier of paragraph 40, wherein the pair of securing devices are pivotally connected to each other such that one of the securing devices is pivotable relative to the other securing device about a pivot axis parallel to one of the arms.

42. The carrier of paragraph 41, wherein the one securing device is an anti-sway device.

43. The carrier of paragraph 41, wherein the pair of securing devices are an upper securing device and a lower securing device, and wherein the lower securing device is pivotable.

44. The carrier of paragraph 32, wherein each securing device is slidable along one of the arms and fixable on the arm.

45. A carrier mountable to a vehicle having a hitch, comprising: (A) a mount for attachment to the hitch; (B) a mast connected to the mount; (C) a first arm and a second arm connected to the mast and configured to support a bicycle, the arms collectively including three securing devices to fasten three frame regions of the same bicycle to the arm, each securing device including a cradle to receive a frame region of the bicycle and a separate strap and a pair of buckles, the strap having a preformed longitudinal curvature that forms a pair of legs, the pair of legs and the pair of buckles collectively forming a pair of ratchets to adjustably fasten both legs to the pair of buckles, the strap also having a harder outer layer defining a series of ratchet teeth along each leg and a softer inner layer to contact a frame region of the bicycle.

46. The carrier of paragraph 45, wherein the first layer is formed of a lower friction material than the second layer.

47. The carrier of paragraph 45, wherein one of the arms has a pair of the securing devices configured to secure distinct frame regions of the same bicycle, and wherein the pair of securing devices are pivotally connected to each other such that one of the securing devices is pivotable relative to the other securing device about a pivot axis parallel to one of the arms.

48. A carrier mountable to a vehicle that includes a hitch having an open end and defining a transverse aperture, comprising: (A) a first portion insertable as a unit into the open end of the hitch and including a retainer having a retracted configuration that permits travel of the first portion into the hitch and an extended configuration capable of disposing the retainer in the transverse aperture to prevent uncoupling of the inserted first portion from the hitch; and (B) a second portion configured to remain outside the hitch when the retainer is disposed in the transverse aperture and including an actuating member manipulable to place the retainer in the retracted configuration.

49. The carrier of paragraph 48, wherein the actuating member is a first actuating member, wherein the second portion includes a second actuating member, and wherein the first portion includes a coupling member that is adjustable by manipulation of the second actuating member to attach the inserted first portion to the hitch.

50. The carrier of paragraph 49, wherein the coupling member includes a wedge member configured to engage an inside surface of the hitch to attach the first portion to the hitch.

51. The carrier of paragraph 50, wherein a lead screw extends from the first portion to the second portion, and wherein the wedge member is disposed in threaded engagement with the lead screw.

52. The carrier of paragraph 48, wherein a tube extends from the first portion to the second portion, and wherein the retainer is disposed inside the tube in the retracted configuration and extends outside the tube in the extended configuration.

53. The carrier of paragraph 52, wherein the tube defines a long axis and guide surface oriented obliquely to the long axis, and wherein the wedge member travels along the guide surface when the lead screw is turned.

54. A carrier mountable to a vehicle including a hitch having an open end and defining a transverse aperture, comprising: (A) a first portion insertable as a unit into the open end of the hitch and including a retainer having a retracted configuration that permits travel of the first portion into the hitch and an extended configuration capable of disposing the retainer in the transverse aperture to prevent uncoupling of the inserted first portion from the hitch; and (B) a second portion configured to remain outside the hitch when the retainer is disposed in the transverse aperture and including an actuating member manipulable to place the retainer in the retracted configuration.

55. The carrier of paragraph 54, wherein the actuating member is a first actuating member, wherein the first portion includes a coupling member, and wherein the second portion includes a second actuating member manipulable to adjust the second coupling member to attach the inserted first portion to the hitch.

56. The carrier of paragraph 55, wherein the second coupling member includes a wedge member.

57. The carrier of paragraph 56, wherein a tube extends from the first portion to the second portion, and wherein the retainer extends outside the tube in the extended configuration.

58. The carrier of paragraph 57, wherein the tube defines a long axis and a guide surface oriented obliquely to the long axis, and wherein the wedge member travels along the guide surface when the second actuating member is manipulated.

59. The carrier of paragraph 57, wherein the tube has a square cross section with rounded corners.

60. The carrier of paragraph 56, wherein a lead screw extends from the first portion to the second portion, and wherein the wedge member is disposed in threaded engagement with the lead screw.

61. The carrier of paragraph 54, wherein a tube extends from the first portion to the second portion, wherein the tube has a front end and defines an aperture spaced from the front end, and wherein a wedge member is disposed in the aperture and configured to travel along an oblique surface of the tube that at least partially bounds the aperture.

62. The carrier of paragraph 54, wherein the retainer is biased toward the extended configuration by one or more biasing members.

63. The carrier of paragraph 54, wherein the retainer has a chamfered surface region configured to contact the hitch and urge the retaining member to the retracted configuration as the retainer is entering the hitch.

64. The carrier of paragraph 54, wherein a lead screw extends from the second portion to the first portion for threaded engagement with a wedge member, and wherein the lead screw is configured to obstruct travel of the retainer to the retracted configuration after the wedge member is wedged against the hitch to attach the first portion to the hitch.

65. The carrier of paragraph 54, wherein the second portion includes an indicator configured to visibly indicate to a user when the retainer is in the extended configuration.

66. The carrier of paragraph 65, wherein the second portion defines a long axis, and wherein the indicator projects farther from the long axis when the retainer is in the extended configuration relative to the retracted configuration.

67. The carrier of paragraph 66, wherein the indicator is more visible when the retainer is in the extended configuration and less visible or not visible when the retainer is in the retracted configuration.

68. The carrier of paragraph 54, further comprising a holding portion connected to the second portion and configured to hold cargo.

69. The carrier of paragraph 68, wherein the cargo includes a bicycle.

70. The carrier of paragraph 69, wherein the holding portion has a pair of arms configured to support a bicycle and secure the bicycle to the pair of arms.

71. A mount for attachment to a hitch defining a transverse aperture, comprising: (A) a tube including a first portion that is insertable into the hitch while a second portion of the tube remains outside of the hitch; (B) a retainer disposed in the first portion of the tube, the retainer being retractable into the tube to permit travel of the first portion into the hitch and extendable from the tube into the transverse aperture to prevent removal of the first portion from the hitch; and (C) a coupling member adjustable to attach the tube to the hitch by engagement of the coupling member with the hitch.

72. The mount of paragraph 71, further comprising an actuating member connected to the second portion of the tube and manipulable to retract the retainer into the tube.

73. The mount of paragraph 72, wherein the actuating member is a first actuating member, further comprising a second actuating member connected to the second portion and manipulable to adjust the coupling member between a first configuration that attaches the mount to the hitch and a second configuration that does not restrict removal of the mount from the hitch.

74. The mount of paragraph 73, wherein the coupling member is a wedge member.

75. A mount for attachment to a hitch defining a transverse aperture, comprising: (A) a tube including a first portion that is insertable into the hitch while a second portion of the tube remains outside of the hitch; (B) a retainer disposed in the first portion of the tube, the retainer being retractable into the tube to permit travel of the first portion into the hitch and extendable from the tube into the transverse aperture to prevent removal of the first portion from the hitch; (C) a biasing member that urges the retainer to extend from the tube; and (D) an actuating member connected to the second portion and manipulable to retract the retainer into the tube.

76. A carrier mountable to a vehicle having a hitch, comprising: (A) a mount for attachment to the hitch; (B) a pair of arms configured to support a bicycle, each arm including a securing device to fasten a frame region of the bicycle to the arm; (C) a mast having a bottom end portion pivotally connected to the mount and a top end portion connected to the pair of arms; (D) an actuating member connected to the top end portion of the mast; and (E) a locking member having a first configuration that blocks backward pivotal motion of the mast and a second configuration that permits the backward pivotal motion; and (F) a linkage extending down the mast from the actuating member to the locking member and operatively connecting manipulation of the actuating member to movement of the locking member from the first configuration to the second configuration.

77. The carrier of paragraph 76, wherein the linkage extends down a majority of the length of the mast.

78. The carrier of paragraph 76, wherein the linkage travels upward when the locking member moves from the first configuration to the second configuration.

79. The carrier of paragraph 76, wherein the mount defines an aperture, and wherein the locking member is moved out of the aperture when the locking member is moved from the first configuration to the second configuration.

80. The carrier of paragraph 76, wherein the locking member is biased toward the first configuration by one or more biasing members.

81. The carrier of paragraph 76, wherein the locking member is prevented from returning to the first configuration from the second configuration when the mast is pivoted backward away from the vehicle.

82. The carrier of paragraph 81, wherein the locking member is urged back to the first configuration by one or more biasing members when the mast is returned to an upright orientation after being pivoted backward away from the vehicle.

83 The carrier of paragraph 76, wherein the locking member travels with the mast when the mast pivots with respect to the mount.

84. A carrier mountable to a vehicle having a hitch, comprising: (A) a mount for attachment to the hitch; (B) a pair of arms configured to support a bicycle, each arm including a securing device to fasten a frame region of the bicycle to the arm; (C) a mast having a pivotal connection to the base and connected to the pair of arms; (D) an actuating member connected to an upper portion of the mast; (E) a locking member adjustable from a first configuration that blocks backward pivotal motion of the mast to a second configuration that permits the backward pivotal motion; and (F) a linkage extending down a majority of the length of the mast and operatively connecting manipulation of the actuating member to adjustment of the locking member from the first configuration to the second configuration.

85. The carrier of paragraph 84, wherein the mast has a front side opposite a back side, and wherein the actuating member is disposed on the back side of the mast.

86. The carrier of paragraph 84, wherein the linkage includes a one-piece link member that extends along a majority of the length of the mast.

While vehicle carrier systems have been particularly shown and described, many variations may be made therein. This disclosure may include one or more independent or interdependent embodiments directed to various combinations of features, functions, elements and/or properties. Other combinations and sub-combinations of features, functions, elements and/or properties may be claimed later in a related application. Such variations, whether they are directed to different combinations or directed to the same combinations, whether different, broader, narrower or equal in scope, are also regarded as included within the subject matter of the present disclosure. Accordingly, the foregoing embodiments are illustrative, and no single feature or element, or combination thereof, is essential to all possible combinations that may be claimed in this or a later application. Each example defines one or more embodiments disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second, or third, for identified elements are used to distinguish between the elements, and do not indicate a limiting number of such elements, and do not indicate a particular position or order of such elements unless otherwise specifically stated.

We claim:

1. A carrier mountable to a vehicle that includes a hitch having an open end and defining a transverse aperture, comprising:
    a first portion insertable as a unit into the open end of the hitch and including a retainer and a wedge member that are configured to separately connect the first portion to the hitch, the retainer having a retracted configuration that permits travel of the first portion into the hitch and an extended configuration in which the retainer is configured to project into the transverse aperture to prevent removal of the inserted first portion from the hitch, wherein the wedge member is configured to engage an inside surface of the hitch to attach the first portion to the hitch; and
    a second portion configured to remain outside the hitch when the retainer is disposed in the transverse aperture and including a first actuating member manipulable to place the retainer in the retracted configuration and a second actuating member manipulable to adjustably engage the hitch with the wedge member.

2. The carrier of claim 1, wherein a lead screw extends from the first portion to the second portion, and wherein the wedge member is disposed in threaded engagement with the lead screw.

3. The carrier of claim 1, wherein a tube forms part of the first portion and part of the second portion, and wherein the retainer projects from the tube in the extended configuration.

4. The carrier of claim 3, wherein the tube defines a long axis and a guide surface oriented obliquely to the long axis, and wherein the wedge member travels along the guide surface when the second actuating member is turned.

5. The carrier of claim 1, wherein each of the first actuating member and the second actuating member is configured to be engaged by hand when manipulated.

6. The carrier of claim 1, wherein the first actuating member is a button configured to be manipulated by pressing the button.

7. The carrier of claim 1, wherein the second actuating member is configured to be manipulated by turning the second actuating member.

8. The carrier of claim 1, further comprising a deformable biasing member configured to urge the retainer to the extended configuration.

9. A carrier mountable to a vehicle that includes a hitch having an open end and defining a transverse aperture, comprising:
    a tube including four sides and having an end region insertable into the open end of the hitch;
    a retainer having a retracted configuration that permits travel of the end region of the tube into the hitch and an extended configuration capable of disposing the retainer at least partially in the transverse aperture of the hitch to prevent removal of the inserted end region of the tube from the hitch, the retainer protruding from only one of the four sides of the tube in the extended configuration; and
    an actuating member connected to the tube and configured to remain outside the hitch, the actuating member being manipulable to place the retainer in the retracted configuration.

10. The carrier of claim 9, further comprising a wedge member operatively connected to the tube and adjustable to attach the tube to the hitch by engaging the hitch with the wedge member.

11. The carrier of claim 10, further comprising a screw disposed in threaded engagement with the wedge member.

12. The carrier of claim 11, wherein the tube defines a long axis and a guide surface oriented obliquely to the long axis, and wherein the wedge member travels along the guide surface when the screw is turned.

13. The carrier of claim 9, further comprising a deformable biasing member configured to urge the retainer to the extended configuration from the retracted configuration.

14. A carrier mountable to a vehicle that includes a hitch having an open end and defining a transverse aperture, comprising:
    a first portion insertable as a unit into the open end of the hitch, the first portion including a retainer having a retracted configuration that permits travel of the first portion into the hitch and an extended configuration configured to project into the transverse aperture of the hitch to prevent removal of the inserted first portion from the hitch;
    a second portion configured to remain outside the hitch and including an actuating member configured to be pressed manually to place the retainer in the retracted configuration from the extended configuration; and
    a deformable biasing member configured to return the retainer to the extended configuration when the actuating member is no longer being pressed.

15. The carrier of claim 14, wherein the deformable biasing member includes a spring.

16. The carrier of claim 14, wherein a tube forms part of the first portion and part of the second portion, and wherein the retainer projects from the tube in the extended configuration.

17. The carrier of claim 16, further comprising a wedge member connected to the tube, wherein the retainer and the wedge member are adjustable separately from one another.

* * * * *